(12) United States Patent
Wilson

(10) Patent No.: US 8,169,726 B2
(45) Date of Patent: May 1, 2012

(54) DISK FILE PREAMPLIFIER FREQUENCY-RESPONSE AND TIME DELAY COMPENSATION

(75) Inventor: Ross Wilson, Menlo Park, CA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/838,601

(22) Filed: Jul. 19, 2010

(65) Prior Publication Data

US 2012/0014011 A1  Jan. 19, 2012

(51) Int. Cl.
*G11B 5/09*  (2006.01)

(52) U.S. Cl. ............... 360/46; 360/31; 360/67; 360/68

(58) Field of Classification Search .................. None
See application file for complete search history.

(56) References Cited

U.S. PATENT DOCUMENTS

| | | | | |
|---|---|---|---|---|
| 4,777,544 | A | | 10/1988 | Brown et al. ................ 360/75 |
| 4,853,810 | A | | 8/1989 | Pohl et al. .................... 360/103 |
| 5,168,413 | A | | 12/1992 | Coker et al. ................. 360/137 |
| 5,257,146 | A | * | 10/1993 | Price et al. ................... 360/67 |
| 5,377,058 | A | * | 12/1994 | Good et al. .................. 360/75 |
| 5,434,717 | A | * | 7/1995 | Yoshinaga et al. .......... 360/46 |
| 5,545,989 | A | | 8/1996 | Tian et al. .................... 324/212 |
| 6,002,539 | A | | 12/1999 | Smith et al. .................. 360/65 |
| 6,008,640 | A | | 12/1999 | Tan et al. ...................... 324/212 |
| 6,104,562 | A | * | 8/2000 | Ottesen et al. ............... 360/63 |
| 6,111,717 | A | * | 8/2000 | Cloke et al. .................. 360/67 |
| 6,118,602 | A | * | 9/2000 | de la Soujeole ............. 360/46 |
| 6,226,137 | B1 | * | 5/2001 | Ngo .............................. 360/46 |
| 6,310,740 | B1 | * | 10/2001 | Dunbar et al. ................ 360/46 |
| 6,415,238 | B1 | | 7/2002 | Ottesen et al. ............... 702/109 |
| 6,424,475 | B1 | * | 7/2002 | Bhandari et al. ............. 360/31 |
| 6,538,833 | B2 | * | 3/2003 | Choi ............................. 360/46 |
| 6,671,111 | B2 | * | 12/2003 | Ottesen et al. ............... 360/31 |
| 6,700,724 | B2 | | 3/2004 | Riddering et al. ........... 360/69 |
| 6,975,467 | B1 | | 12/2005 | Lewkowicz et al. ......... 360/31 |
| 7,082,004 | B2 | * | 7/2006 | Kajiyama et al. ............ 360/46 |
| 7,087,004 | B1 | * | 8/2006 | Berke ........................... 482/136 |
| 7,119,990 | B2 | * | 10/2006 | Bajorek et al. ............... 360/128 |
| 7,180,692 | B1 | | 2/2007 | Che et al. ..................... 360/31 |
| 7,369,341 | B2 | * | 5/2008 | Yokohata et al. ............. 360/31 |
| 7,468,856 | B2 | * | 12/2008 | Fitzpatrick et al. .......... 360/75 |

(Continued)

FOREIGN PATENT DOCUMENTS

WO   WO2010/014078 A1   4/2010

OTHER PUBLICATIONS

Tang, Yawshing et al., "Overview of Fly Height Control Applications in Perpendicular Magnetic Recording", IEEE Transactions on Magnetics., vol. 43, No. 2, Feb. 2007, pp. 709-714.

(Continued)

*Primary Examiner* — Dismery Mercedes

(74) *Attorney, Agent, or Firm* — Christopher P. Maiorana, PC

(57) ABSTRACT

An apparatus including one or more reader circuits, one or more writer circuits, and a loopback channel. The one or more reader circuits may be configured to read data from a magnetic medium. The one or more writer circuits may be configured to write data to the magnetic medium. The loopback channel is coupled between the one or more reader circuits and the one or more writer circuits.

19 Claims, 18 Drawing Sheets

U.S. PATENT DOCUMENTS

| | | | |
|---|---|---|---|
| 7,477,467 B1 * | 1/2009 | Sutardja | 360/46 |
| 7,595,951 B2 * | 9/2009 | Dolan et al. | 360/62 |
| 7,616,398 B2 | 11/2009 | Gong et al. | 360/75 |
| 7,852,584 B2 * | 12/2010 | Matsui et al. | 360/46 |
| 2004/0032681 A1 * | 2/2004 | Smith et al. | 360/31 |
| 2005/0180041 A1 * | 8/2005 | Kajiyama et al. | 360/67 |
| 2007/0127148 A1 | 6/2007 | Yokohata et al. | 360/31 |
| 2007/0133118 A1 | 6/2007 | Kajitani | 360/75 |
| 2007/0230002 A1 | 10/2007 | Kassab | 360/31 |
| 2007/0230018 A1 | 10/2007 | Schreck et al. | 360/75 |
| 2007/0279785 A1 * | 12/2007 | Dolan et al. | 360/46 |
| 2009/0122437 A1 * | 5/2009 | Gong et al. | 360/75 |
| 2009/0154003 A1 | 6/2009 | Mathew et al. | 360/75 |
| 2009/0195912 A1 * | 8/2009 | Sato | 360/75 |
| 2011/0002062 A1 * | 1/2011 | Fischer et al. | 360/67 |

OTHER PUBLICATIONS

Xu, Jianfeng et al., "Head-Medium Spacing Measurement Using the Read-Back Signal", IEEE Transactions on Magnetics, Vo. 42, No. 10, Oct. 2006, pp. 2486-2488.

\* cited by examiner

Wallace Equation for head output voltage as
a function of head-medium magnetic spacing:

$$V = K \cdot e^{-\frac{2\pi \cdot x}{\lambda}} = K \cdot e^{-\frac{2\pi \cdot f \cdot x}{v}} \qquad \text{Eq. 1}$$

where $V = |\text{reproduce voltage}|$; $v \equiv$ head/disc velocity;
$f \equiv$ frequency; $\lambda =$ wavelength; $K =$ factor also accounting
for Preamp and Head gain variation versus frequency; and
$x =$ magnetic spacing/magnetic fly height.

For two chosen frequencies $f_1, f_2$ $(f_2 > f_1)$ at
Touchdown/Calibration fly height $d_{TD}$,
associated tone amplitudes are measured:

$$V_1^{x=d_{TD}} = K_1 \cdot e^{-\frac{2\pi \cdot f_1 \cdot d_{TD}}{v}} \quad \text{at } f_1 \;\Rightarrow\; K_1 = V_1^{x=d_{TD}} \cdot e^{\frac{2\pi \cdot f_1 \cdot d_{TD}}{v}} \qquad \text{Eq. 2}$$

$$V_2^{x=d_{TD}} = K_2 \cdot e^{-\frac{2\pi \cdot f_2 \cdot d_{TD}}{v}} \quad \text{at } f_2 \;\Rightarrow\; K_2 = V_2^{x=d_{TD}} \cdot e^{\frac{2\pi \cdot f_2 \cdot d_{TD}}{v}} \qquad \text{Eq. 3}$$

The values of $V_1^{x=d_{TD}}$ and $V_2^{x=d_{TD}}$ are permanently retained, e.g.,
in the drive's FLASH memory for later use.

FIG. 3A

Subsequently, in operation, when an *unknown* magnetic FH $d$ is to be sensed, the following process may be performed:

Set $d = d_{TD} + d_\Delta$ and measure amplitudes $V_1^{x=d}$, $V_2^{x=d}$ at $f_1$, $f_2$;

Use the saved Touchdown/Calibration values $V_1^{x=d_{TD}}$ and $V_2^{x=d_{TD}}$; and Compute the quotient:

$$\frac{V_1^{x=d}}{V_2^{x=d}} = \frac{K_1 \cdot e^{-2\pi f_1 d/v}}{K_2 \cdot e^{-2\pi f_2 d/v}} = \left[\frac{V_1^{x=d_{TD}} \cdot e^{\frac{2\pi \cdot f_1 \cdot d_{TD}}{v}}}{V_2^{x=d_{TD}} \cdot e^{\frac{2\pi \cdot f_2 \cdot d_{TD}}{v}}}\right] \cdot \frac{e^{-2\pi f_1 (d_{TD}+d_\Delta)/v}}{e^{-2\pi f_2 (d_{TD}+d_\Delta)/v}} = \frac{V_1^{x=d_{TD}}}{V_2^{x=d_{TD}}} e^{\frac{2\pi d_\Delta (f_2 - f_1)}{v}}; \text{ and}$$

Solve for $d_\Delta$ $\Rightarrow d_\Delta = \frac{v}{2\pi(f_2 - f_1)} \cdot \ln\left[\frac{V_1^{x=d}}{V_2^{x=d}} \cdot \frac{V_2^{x=d_{TD}}}{V_1^{x=d_{TD}}}\right].$  Eq. 4

Note the disappearance of the constant $d_{TD}$.

FIG. 3B

The sensitivity of $FH$ to errors in the ratio $\dfrac{V_1^{x=d}}{V_2^{x=d}}$ caused, e.g., by Preamp differential gain shift occurring since Touchdown/Calibration, may be determined by computing the sensitivity function as follows:

$$S^d_{\left(\frac{V_1^{x=d}}{V_2^{x=d}}\right)} \equiv \frac{\text{Fractional change of } d}{\text{Fractional change in } \left(\dfrac{V_1^{x=d}}{V_2^{x=d}}\right)} : \qquad \text{Eq. 5}$$

$$S^d_{\left(\frac{V_1^{x=d}}{V_2^{x=d}}\right)} \equiv \frac{\delta d / d}{\delta\left(\dfrac{V_1^{x=d}}{V_2^{x=d}}\right) / \left(\dfrac{V_1^{x=d}}{V_2^{x=d}}\right)} = \frac{\left(\dfrac{V_1^{x=d}}{V_2^{x=d}}\right)}{d} \cdot \frac{\partial d}{\partial\left(\dfrac{V_1^{x=d}}{V_2^{x=d}}\right)} = \frac{v}{2\pi(f_2 - f_1) \cdot d} \qquad \text{Eq. 6}$$

Note that $\dfrac{\partial d}{\partial\left(\dfrac{V_1^{x=d}}{V_2^{x=d}}\right)} = \dfrac{\partial d_\Delta}{\partial\left(\dfrac{V_1^{x=d}}{V_2^{x=d}}\right)} = \dfrac{v}{2\pi(f_2 - f_1)} \cdot \left(\dfrac{V_1^{x=d}}{V_2^{x=d}}\right)^{-1}$  Eq. 7

∴ An allowed $\psi$ percent error in magnetic $FH$ at distance $d$ implies a permissible percentage error $\varepsilon$ in $\left(\dfrac{V_1^{x=d}}{V_2^{x=d}}\right)$ of, $$\varepsilon = \frac{\psi}{S^d_{\left(\frac{V_1^{x=d}}{V_2^{x=d}}\right)}} \% = \frac{\psi \cdot 2\pi(f_2 - f_1) \cdot d}{v} \% \qquad \text{Eq. 8}$$

In dB, $\varepsilon_{dB} = 20 \cdot \log_{10}(1 + \varepsilon/100)$ dB  Eq. 9

$$\Rightarrow \varepsilon_{dB} = 20 \cdot \log_{10}\left(1 + \frac{\psi}{100} \times \frac{2\pi(f_2 - f_1) \cdot d}{v}\right). \qquad \text{Eq. 10}$$

FIG. 4A

Example:

Consider a 3.5-inch, 7200 RPM / 120 RPS disc drive having 3 Gbit/sec OD max. transfer rate and magnetic FH $d \sim 6nm$.

OD radius $\sim 1.6"$ (0.041m) $\Rightarrow v \cong 31$ m/s. $f = DR/2$.

Reasonable choices for $f_1$ and $f_2$ are $f_1 = f/8$; $f_2 = 3f/8$.

$\Rightarrow f = 1.5e9$ Hz, $f_1 \cong 375MHz$; $f_2 \cong 1125MHz$.

Find allowable dB differential gain variation to assure measured FH error $\psi \leq \pm 10\%$.

$$S_{\left(\frac{V_1^{x=d}}{V_2^{x=d}}\right)}^d \equiv \frac{v}{2\pi(f_2 - f_1) \cdot d} \approx 1.1, \quad \varepsilon \equiv \frac{\psi}{S_{\left(\frac{V_1^{x=d}}{V_2^{x=d}}\right)}^d} \approx \pm 9.1\%,$$

Compute allowable dB gain errors corresponding to positive and negative FH error, separately :

$-0.83dB \leq \varepsilon_{dB} = 20 \cdot \log_{10}(1 + \varepsilon/100)$ dB $\leq +0.76dB$

FIG. 4B

DISK FILE PREAMPLIFIER FREQUENCY-RESPONSE AND TIME DELAY COMPENSATION

FIELD OF THE INVENTION

The present invention relates to systems and methods for accessing a storage medium generally and, more particularly, to a method and/or apparatus for implementing disk file preamplifier frequency response and time-delay compensation.

BACKGROUND OF THE INVENTION

Writing information to a magnetic storage medium includes generating a magnetic field in close proximity to the storage medium to be written. In conventional storage devices using a magnetic medium, the magnetic field is generated in close proximity to the magnetic storage medium using a conventional read/write head assembly. The read/write head assembly can include inductive write and magneto-resistive (MR) read elements. Information to be stored is sent to writing/encoding circuits. The writing/encoding circuits encode the information to maximize storage efficiency. The writing/encoding circuits then modulate a current in the write head to produce a magnetic field of alternating polarity that magnetizes the storage medium. The quality of the written information is highly dependent on a proper spacing (i.e., fly-height) between the write head and the medium.

Referring to FIG. 1, a diagram is shown illustrating a read/write head assembly 10 disposed in relation to a storage medium 12 as a way to depict a magnetic fly-height (or spacing) 14. The distance between the read/write head assembly 10 and the storage medium 12 is commonly referred to as the fly-height. Proper control of the fly-height during reading is required to assure that the read back signal exhibits the best possible signal-to-noise ratio, and thereby improves performance and prevents injurious head-disc contact. In general, the term fly-height is used to refer to the magnetic fly-height 14. The magnetic fly-height 14 generally corresponds to a distance between a magnetic film on the storage medium 12 and transducer pole-tips of the read/write assembly 10. However, because the head surfaces of the read/write assembly 10 and the storage medium 12 are protectively overcoated and lubricated (i.e., coating layers 16 and 18, respectively) to eliminate corrosion and mitigate damage from momentary head-disc contact, a physical fly-height (or spacing) 20 is less than the magnetic fly-height 14 by the aggregate thickness of the coatings 16 and 18.

In a conventional disk file, fly-height is determined by measuring amplitudes of two or more harmonics of the readback signal. The conventional approach uses a vacant or dedicated area on the magnetic storage medium containing a periodic pattern from which the harmonics can be measured. While the conventional approach provides a reasonably static estimate of fly-height, the conventional approach does not provide an indication of any changes in fly-height occurring during standard operational periods. As such, the conventional approach does not provide an ability to adjust for changes occurring during the operation of the magnetic storage medium. To mitigate partially the inability of conventional fly-height measurement schemes to control fly-height during the course of a long write or read data transfer, servo information interleaved with the data can be used as a source of read back harmonics.

Conventional harmonic-amplitude-sensing based fly-height measurement methods rely on precise knowledge of the gain of the readback signal path comprising Preamplifier and Recording Channel analog circuits and the interconnecting transmission lines. Other methods of fly-height measurement, for example those based on channel bit density (CBD) estimation and on amplitude of the overall readback signal, can exhibit sensitivity to gain variation at specific frequencies and hence can benefit from an ability to stabilize gains at those frequencies.

Fly-height measurement accuracy is limited by unavoidable drifts in amplitude response of the preamplifier reader, and in the read channel analog portions. Even in a state-of-the-art device, accuracy of fly-height measurement below ~4 nm spacing is poor. A further tolerance-related issue arises in Bit Patterned Media (BPM) Recording in which precise alignment of written transitions to predeposited lands on the storage medium is sought. In this mode of recording, compensation of delay changes in the read and write paths encompassing the preamplifier and record channel is crucial. One method of compensating delay time variation uses periodic iterative write/read operations in a predefined area to determine a write phase yielding maximum playback amplitude. However, such a method degrades average file transfer rates.

A method and/or apparatus for measuring and/or compensating variation in preamplifier frequency response in order to maintain constant relative gains over device lifetime, at specific frequencies, would be desirable. It would also be desirable in BPM recording systems to provide a method and/or apparatus for measuring aggregate delay of preamplifier and channel write and read paths, to allow compensation of variation in the delay.

SUMMARY OF THE INVENTION

The present invention concerns an apparatus including one or more reader circuits, one or more writer circuits, and a loopback channel. The one or more reader circuits may be configured to read data from a magnetic medium. The one or more writer circuits may be configured to write data to the magnetic medium. The loopback channel is coupled between the one or more reader circuits and the one or more writer circuits.

The objects, features and advantages of the present invention include providing a method and/or apparatus for implementing disk file preamplifier frequency response and time-delay compensation that may (i) provide a loopback channel that allows characterization of preamplifier frequency response at selected frequencies, (ii) measure and compensate variation in preamplifier frequency response in order to maintain constant relative gains, at specific frequencies, over device lifetime, (iii) provide gain stability for fly-height measurement techniques based on relative amplitude of playback tones, (iv) allow field characterization of reader frequency response, (v) derive a correction factor to remove gain changes, (vi) allow write data-to-read data timing to be measured, (vii) support bit-patterned-media (BPM) recording, (viii) compensate delay variation in the preamplifier write and read paths, and/or (ix) extend domain of applicability of magnetic disk drive read-write preamplifiers to Tb/in$^2$ areal density level.

BRIEF DESCRIPTION OF THE DRAWINGS

These and other objects, features and advantages of the present invention will be apparent from the following detailed description and the appended claims and drawings in which:

FIGS. 3A and 3B illustrate use of Wallace equation in fly-height determination process in accordance with an embodiment of the present invention;

FIGS. 4A and 4B illustrate process for calculation of permissible long-term gain ratio accuracy in accordance with an embodiment of the present invention;

DETAILED DESCRIPTION OF THE PREFERRED EMBODIMENTS

Figure 1:
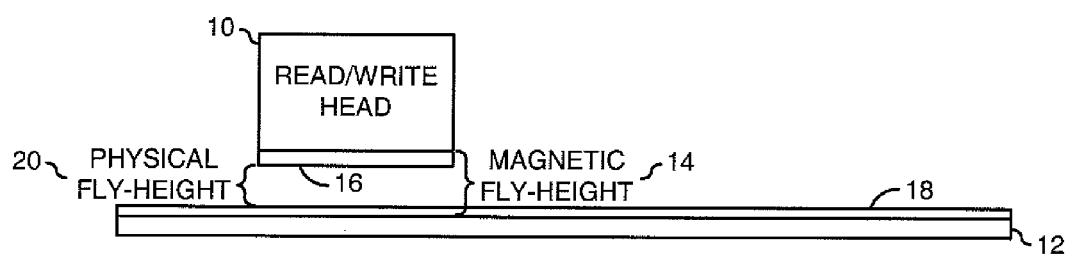
FIG. 1 is a diagram illustrating a read/write head assembly disposed in relation to a storage medium to depict magnetic and physical fly-heights.

A reproduce head in magnetic disk files may be used as a fly-height (FH) transducer in both perpendicular and longitudinal recording. Although implementations may vary, the underlying theme involves application of at least two distinct frequencies and the Wallace spacing-loss equation to infer fly-height. The use of multiple frequencies allows read path bulk gain variation to be decoupled from the measurement of fly-height. However, a ratio of gains at the selected frequencies generally needs to be maintained substantially constant over product lifetime. Low fly-height and accurate control of head-disk spacing are primary considerations in progressing to, and exceeding 1 Tbit/in$^2$ density.

Disc file preamplifiers may be constructed with one or more front end (or read headcell) low-noise amplifiers (LNA) and associated magneto-resistive (MR) head bias-injection circuits. Each headcell may serve a dedicated recording head. As directed by a head select command from the system data controller, a single read headcell may be activated. An output of the headcell may be passed through gain and signal processing stages that are common to all headcells, and then to the recording channel. Similarly, a set of write headcells may be provided. Each write headcell may be associated with a specific write head. All write headcells may be served by a common set of signal processing electronics that receives write data input from the recording channel. The present invention generally provides for additional dummy (or loopback) write loopback and read loopback cells analogous to the read and write headcells. The write loopback and read loopback cells serve no head, and are linked together so that write data passes through the common writer circuits, through the loopback cells; and returns to the recording channel through the common read electronics. In an alternative embodiment, the loopback function in accordance with the present invention may be implemented by providing bridging circuitry within associated pairs of read and write headcells.

The present invention generally provides methods and circuits to produce a correction factor to renormalize preamplifier read path relative gains to compensate for component aging and environmental changes. Without renormalization, using the unaided multi-frequency technique to attain accurate sensing of fly-heights may be difficult. A further benefit of a preamplifier implemented in accordance with the present invention is a capability for correcting for relative gain variation in analog signal processing elements downstream from the preamplifier. For example, implementations in accordance with the present invention may measure and compensate variation in preamplifier frequency response in order to maintain constant relative gains over device lifetime, at specific frequencies. Gain stability is generally required by fly-height measurement techniques based on relative amplitude of playback tones. The present invention may provide a method and apparatus that is suitable also for field characterization of reader circuitry frequency response. In one example, a loopback channel in accordance with the present invention generally allows a user to characterize frequency response at selected frequencies and to derive a correction factor to remove (compensate) gain changes. The loopback channel in accordance with the present invention may provide a valuable feature for supporting low-nanometer fly-height measurement. The present invention may be practiced in concert with alternate fly-height control mechanisms and algorithms, or in absence of active fly-height control, in metrology applications requiring accurate fly-height sensing.

The present invention may provide a method that is applicable also to bit-patterned-media (BPM) recording to compensate delay variation in the preamplifier write and read paths. Accurate transition placement on preformed single-bit magnetic lands is a prerequisite to bit-patterned-media (BPM) recording. For example, with a ~4 Gbit/second data rate having a bit-cell of ~250 ps, a ~25 ps delay change in the joint write-read preamplifier data path is a material impairment, and a value typical of conventional disk file preamplifiers. The present invention generally provides correction factors useful for delay compensation techniques. The loopback channel in accordance with the present invention may also allow write data-to-read data timing to be measured, e.g., in support of BPM.

Figure 2:
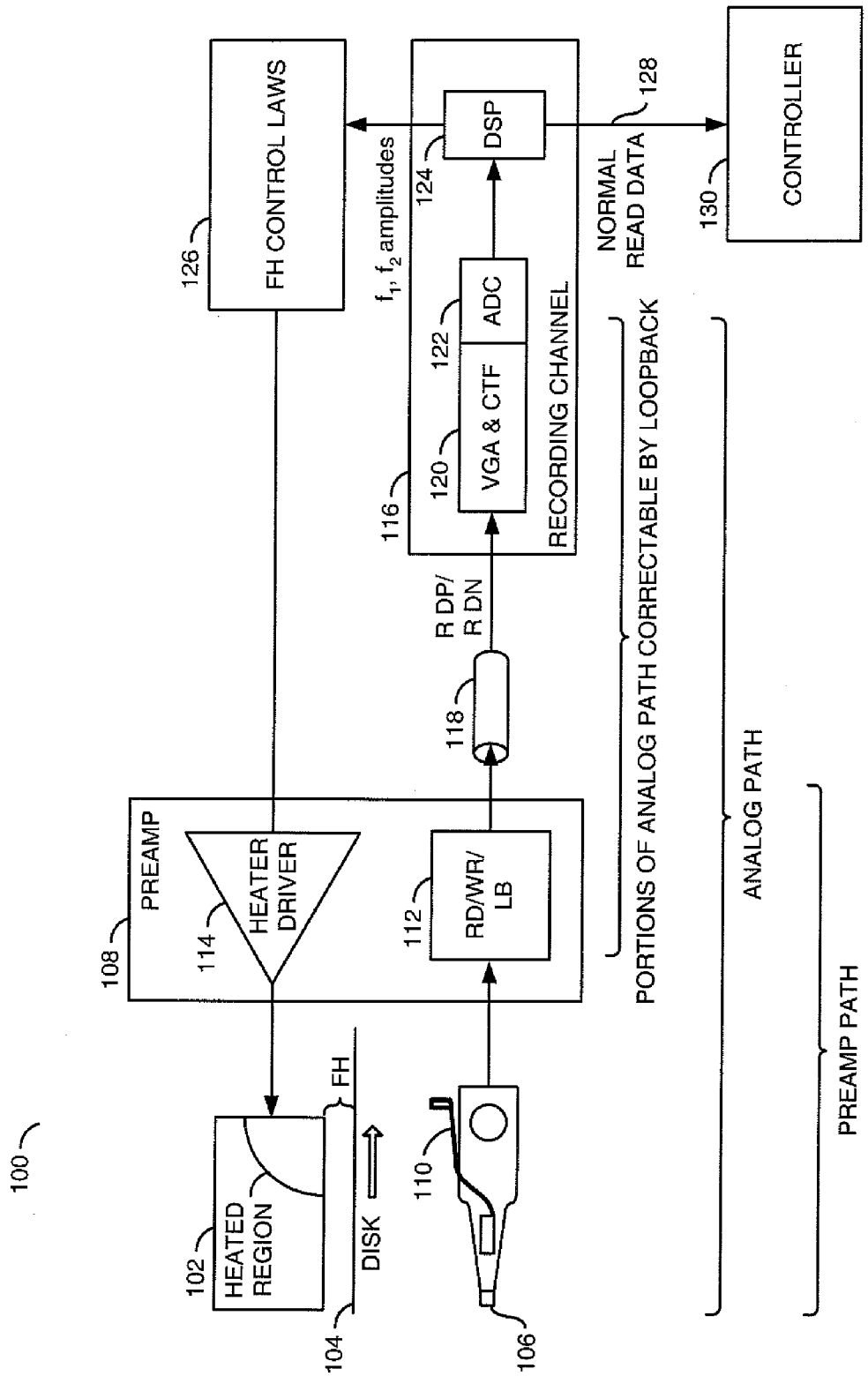
FIG. 2 is a block diagram illustrating a magnetic recording system including a preamplifier in accordance with embodiments of the present invention.

Referring to FIG. 2, a diagram is shown illustrating an example magnetic recording system environment in which embodiments of the present invention may be implemented. A system 100 may comprise a slider 102, a magnetic storage (record) medium 104, a magneto-resistive (MR) read head 106, a preamplifier 108, a flex-on-suspension (FOS) transmission line (or element) 110, a read/write/loopback module 112, a heater driver 114, a read (recording) channel 116, an actuator flex circuit 118, a variable gain amplifier (VGA) and continuous-time filter (CTF) 120, an analog-to-digital converter (ADC) 122, a digital signal processing (DSP) block 124, a fly-height (FH) control block 126, a bus 128 and a disk drive data controller 130. The read/write/loopback module 112 of the preamplifier 108 generally includes read headcells, read back-end (common) circuits, write headcells, and write back-end (common) circuits. The read/write/loopback module 112 also contains a loopback channel in accordance with the present invention. The loopback channel allows a user to characterize frequency response at selected frequencies, and to derive a correction factor to remove gain changes. The loopback channel in accordance with the present invention generally provides a valuable feature for supporting low-nm fly-height measurement. The loopback channel also allows write data-to-read data timing to be measured, in support of bit-patterned media (BPM).

The slider 102 generally flies at about 2-10 nm from the rotating record medium 104. The slider 102 may carry magneto-resistive (MR) read head(s) 106 and write head(s) (not shown). Although inductive read heads have been superseded by MR types, inductive read heads may also be used with the present invention. The slider 102 also carries a heater that may influence fly-height through thermal deformation of the slider 102. The preamplifier 108 may be connected to the magneto-resistive (MR) read head(s) 106 and write head(s) by the flex-on-suspension (FOS) transmission line 110. The read/write/loopback sub-circuit 112 and the heater driver sub-circuit 114 are generally implemented as part of the preamplifier 108. The preamplifier 108 is generally mounted on a base of an accessing mechanism (e.g., arm) driven, for example, by a voice coil motor (not shown). The slider 102 may be mechanically coupled to the accessing mechanism through a flexible suspension on which is also mounted the FOS 110. The FOS 110 conveys signals between the preamplifier 108 and the read/write head elements 106 fabricated on slider 102.

The preamplifier 108 may be coupled to the recording channel 116 by the actuator flex circuit 118. The recording channel 116 generally processes the amplified head signal through the analog variable gain amplifier (VGA) and continuous-time filter (CTF) stages (VGA & CTF) 120, whereupon the signal is digitized (e.g., by the ADC 122). An output of the ADC 122 is directed to the DSP block 124. The DSP block 124 performs data detection (e.g., using iterative or maximum-likelihood processes) and also filters and extracts harmonic amplitudes of the signal received from the preamplifier 108. The extracted harmonic amplitudes may be used for fly-height detection. The harmonic (tone) amplitudes may be conveyed to the FH control block 126 for further processing (described below in connection with FIGS. 3A, 3B, 4A and 4B). The fly-height control block 126 may be implemented, for example, in firmware or hardware. The fly-height control block 126 generally closes the fly-height regulation loop through the heater driver sub-circuit 114. During read operations, deserialized reproduced data are presented by the recording channel 116 over the bus 128 to the disk drive data controller 130. During write operations, bus 128 conveys write data from the data controller 130 to the recording channel 116, where the write data are encoded appropriately for inscription on the recording medium 104.

In a conventional two-frequency frequency ($f_1$, $f_2$) fly-height measurement scheme for perpendicular or longitudinal recording, amplitudes of the ($f_1$, $f_2$) tones are detected at an output of the preamplifier 108 (e.g., measured at the output of read channel ADC 122). The detected amplitudes are processed to extract fly-height information. A typical application of fly-height control may be described as follows: First, at the factory, at nominal environment, with the head over a prerecorded calibration region, the head is allowed to approach the surface of the record medium (referred to as approaching touchdown). The head is then backed off to a predetermined baseline (or fly-height set point) at which the baseline amplitudes are measured. Touchdown may be sensed through an oscillation superposed on a track-following position error signal, or by auxiliary acoustic or thermal sensors. Touchdown and backoff are preferably not performed in the field, due to increased risk in the process of catastrophic head-disc interference.

Thereafter, periodically during the lifetime of the drive, the head is returned to the prerecorded calibration region and the harmonic amplitudes, occurring at the then-current fly-height, are re-measured. The fly-height error relative to setpoint is computed and a compensated and scaled version of the error is applied to the heater driver in the preamplifier 108, to regulate head fly-height to the set point. The re-measuring process may be iterated as necessary. The theory relating harmonic amplitudes to fly-height is based on the well-known Wallace equation relating reproduce-process frequency response to head-medium spacing (see H. N. Bertram, Theory of Magnetic Recording. Cambridge, England: Cambridge University Press, 1994, which is herein incorporated by reference). Because the Wallace equation fails in perpendicular recording for long wavelengths, flux density needs to be maintained high in the calibration region, or a correction needs to be applied to the basic Wallace formula.

Referring to FIGS. 3A and 3B, an example magnetic fly-height (or spacing) calculation using the Wallace 'spacing loss' Equation is illustrated. Variation in the ratio of reader signal-path gains at $f_1$ and $f_2$, including effects due to interaction of the reader input stage and the Flex-on-Suspension—relative to the ratio existing at baseline—affects fly-height measurement accuracy. Differential gain (e.g., change in relative gain at frequencies $f_1$ and $f_2$) needs to be limited over drive lifetime. The analysis shown in FIGS. 3A and 3B generally illustrates determination of a baseline measurement of magnetic fly-height inferred from touchdown (FIG. 3A). Tone amplitude values associated with the baseline magnetic fly-height and subsequent values of tone amplitudes may be used to determine an unknown magnetic fly-height during the lifetime of the drive (FIG. 3B).

Referring to FIG. 4A, a process is illustrated for quantifying allowable analog path differential gain variation. The magnetic fly-height calculations shown in FIGS. 3A and 3B may be extended to quantify a long-term gain-ratio accuracy specification of the entire analog system spanning from the MR head 106 through the recording channel analog path (e.g., the VGA & CTF block 120). In one example, bounds on differential gain shift needed to achieve a specified fly-height measurement accuracy may be determined using the process illustrated in FIG. 4A. FIG. 4B illustrates application of the technique of FIG. 4A using example values.

Figure 5:
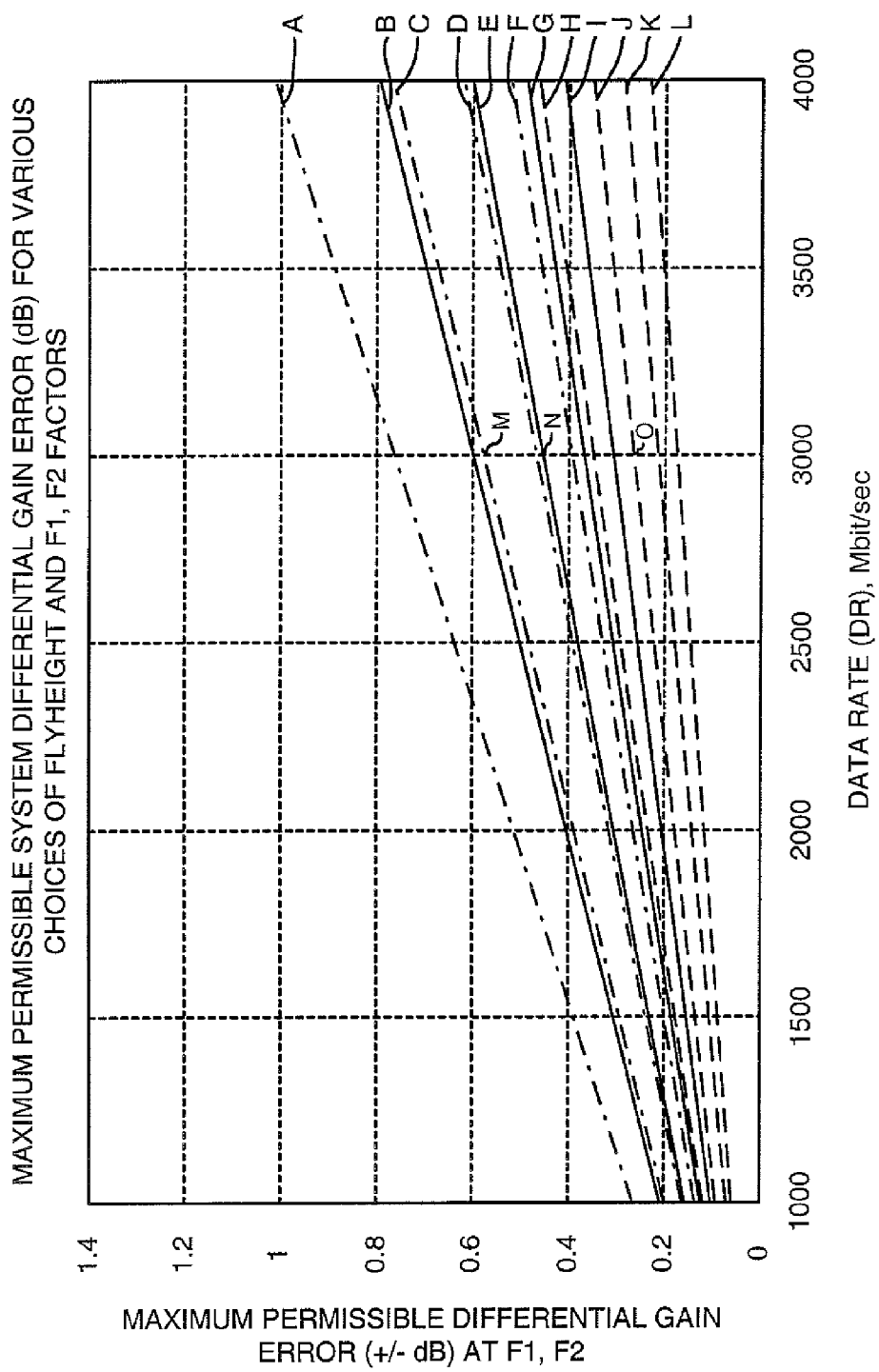
FIG. 5 is a line graph illustrating permissible differential gain error for various fly-heights.

Referring to FIG. 5, a graph is shown illustrating plotted curves A-L representing example maximum permissible differential gain error $\in_{dB}$ for a fixed ±10% magnetic fly-height error; in this case for a 7200 RPM, 3.5 inch drive with head positioned near the OD. Sensitivity (Sd) may be determined according to the equation Eq. 6 of FIG. 4a. Error (±dB) may be determined according to the equations Eq. 8-Eq. 10 of FIG. 4A. For example, the graph of FIG. 5 may be read to show that at DR=3 Gbit/second data rate and representative $f_1$=DR/8 and $f_2$=3DR/8, permissible levels of system differential gain error should not exceed ~±0.58 dB to support a magnetic fly-height of ~4.5 nm. Fly-height and frequency values for the curves A-L are summarized in the following TABLE 1:

TABLE 1

| Curve | FH (nm) | (f1, f2) Factors |
|---|---|---|
| A | 4.5 | (1/6, 3/6) * DR |
| B | 3.5 | (1/6, 3/6) * DR |
| C | 4.5 | (1/8, 3/8) * DR |
| D | 4.5 | (1/10, 3/10) * DR |
| E | 3.5 | (1/8, 3/8) * DR |
| F | 4.5 | (1/12, 3/12) * DR |
| G | 3.5 | (1/10, 3/10) * DR |
| H | 2 | (1/6, 3/6) * DR |
| I | 3.5 | (1/12, 3/12) * DR |
| J | 2 | (1/8, 3/8) * DR |
| K | 2 | (1/10, 3/10) * DR |
| L | 2 | (1/12, 3/12) * DR |

Although the factors presented may be indicative of factors supported in a typical recording channel. However, other factors may be used accordingly to meet the design criteria of a particular implementation. The point M marks a location on curve C representing a data rate of 3005 Mbits/sec, a fly-height of 4.5 nm and maximum permissible differential gain error of ±0.58 dB. The point N marks a location on curve E representing a data rate of 3000 Mbits/sec, a fly-height of 3.5 nm and maximum permissible differential gain error of ±0.46 dB. The point O marks a location on curve J representing a data rate of 3000 Mbits/sec, a fly-height of 2 nm and maximum permissible differential gain error of ±0.26 dB.

The 4.5 nm magnetic fly-height is in the range needed for progression to 1 Tbit/in$^2$ recording densities. Of the ±0.58 dB system differential gain error, allotting ~±0.5 dB error to the combined preamplifier read/write/loopback module 112, flex-on-suspension transmission line 110, and MR Head 106 cascade is reasonable, but is generally unattainable in conventional readers. The remaining ~±0.08 dB error may be consumed in the analog processing circuits (e.g., VGA & CTF block 120) of the recording channel 116 and as quantization noise in the associated ADC 122. The present invention generally provides a scheme capable of reducing 'corrected' errors to the permissible levels.

Figure 6:
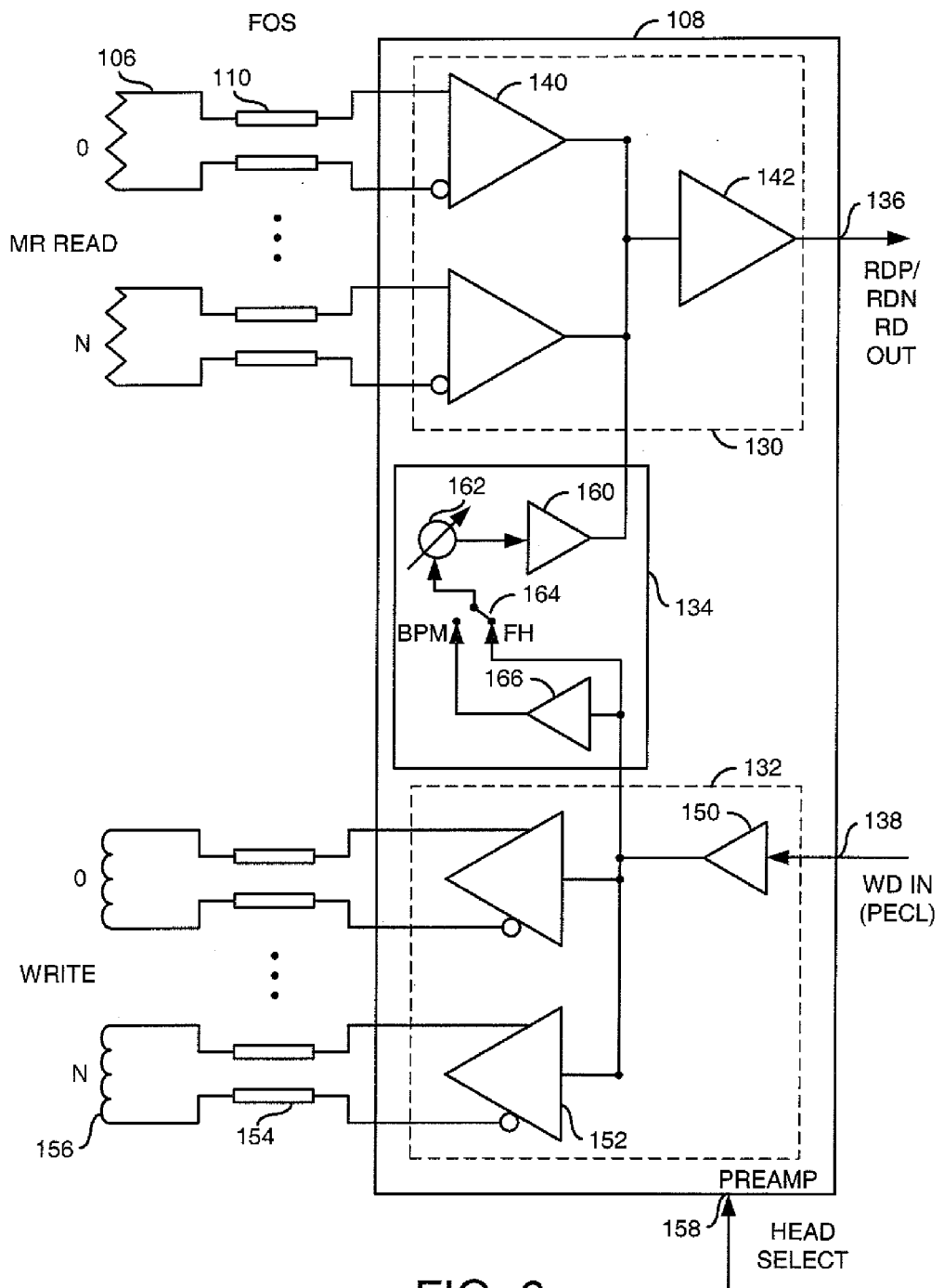
FIG. 6 is a block diagram illustrating an example implementation of the preamplifier of FIG. 2 in accordance with an example embodiment of the present invention.

Referring to FIG. 6, a block diagram is shown illustrating an example implementation of the preamplifier 108 of FIG. 2 in accordance with an example embodiment of the present invention. In one example, the preamplifier 108 may be implemented as a Multi-head preamplifier. The heater driver element 114 is omitted for clarity. The preamplifier 108 in accordance with an embodiment of the present invention may comprise read path circuitry 130, write path circuitry 132, a loopback path (or channel) 134, a terminal 136, and a terminal 138. The normal read path circuitry 130 of the preamplifier 108 includes input stage(s) (or circuits) 140 (e.g., read headcells) and gain stage(s) (or circuits) 142. The normal read data path also includes the MR read head(s) 106 and the flex on suspension (FOS) assemblies 110. The input stage(s) 140 and gain stage(s) 142 are consolidated, for simplicity, into the read/write/loopback module 112 of FIG. 2. The number of input stages 140 may equal the number of heads on the drive. The gain stage(s) 142 may jointly provide a user-programmable gain having a typical range from ~12 dB to ~42 dB. The gain stage(s) 142 may also provide programmable frequency response shaping. The gain stage(s) 142 may serve the input stage(s) 140 in common. Termination of the FOS 110 may be accomplished in the input stage(s) 140. The input stage(s) 140 may incorporate MR bias circuitry to bias the associated MR head(s) 106 to an optimal operating point. After processing, an amplified readback signal (e.g., RD OUT) may be presented on the terminal 136 for conveyance to the read channel 116 over the flex circuit 118. The amplified readback signal RD OUT may be presented in differential form (e.g., RDP/RDN).

The write path circuitry 132 of the preamplifier 108 generally begins at the terminal 138. In one example, the terminal 138 may receive low-swing differential write data (e.g., WD IN) from writer circuits (not shown in FIG. 1) of the recording channel 116 via the flex circuit 118. Incoming write data pass through receiver and signal conditioning stage(s) 150, through write driver(s) (write headcells) 152, then to FOS 154 and inductive write head(s) 156. Multiple read and write elements may be included in the preamplifier 108. Multiple read and write elements allow a single silicon chip to serve a multiplicity of heads. In one example, the preamplifier 108 may include a head select bus 158. The head select bus 158 may be used to control which read and write path(s) is(are) activated at a given time.

The loopback path (or channel) 134 of the preamplifier 108 may be coupled to (i) the read path circuitry 130 between the input stage(s) 140 and the gain stage(s) 142 and (ii) the write path circuitry 132 between the receiver and signal conditioning stage(s) 150 and the write driver(s) 152. In one example, the loopback path 134 may have an input that may be coupled to an output of the receiver and signal conditioning stage(s) 150 and an output that may be coupled to an input of the gain stage(s) 142. In one example, the loopback path 134 may comprise a block (or element) 160, a block (or element) 162, a block (or element) 164, and a block (or element) 166. The elements 160, 162, 164 and 166 are novel elements of the present invention. The blocks 160, 162, 164 and 166 are generally activated only for loopback compensation calibration. During loopback compensation calibration, the input circuits 140 are disabled. If loopback compensation calibration is to be performed during the course of a write operation, one or more write headcells 152 may remain enabled. If loopback compensation calibration is to be performed in isolation, all of the write driver(s) 152 may be de-energized. In one example, the head select bus 158 may encode a loopback command, or other mode tags may be used, to enable the loopback channel 134 and disable the input stage(s) 140 and write driver(s) 152.

The block 160 may be implemented, in one example, as a simplified (dummy) version of a reader input stage 140. The block 160 is generally referred to herein as a read loopback cell (or circuit). The read loopback cell 160 may, for example, omit the MR bias circuitry incorporated into the normal reader input stage(s) 140, in the interest of simplicity and reduced power consumption. Additional features present in the normal reader input stage(s) 140 may be excised from the read loopback cell 160, so long as the read loopback cell 160 adequately replicates the response of the input stage(s) 140. For example, the input stage(s) 140 and the read loopback cell 160 should possess similar input structures.

The block 162 may be implemented, in one example, as a current switch circuit. The block 162 generally provides a variable-amplitude current-mode differential signal drive to the read loopback cell 160. Programmable amplitude control (e.g., from register fields in a control logic of the preamplifier 108) may allow the user to select drive levels that will maintain the output of the preamplifier 108 presented at the terminal 136 securely in a linear range. Programmability is desirable to counter the effect of selectable gains in the reader gain stage(s) 142. In one example, the current switch 162 may be implemented, using conventional techniques, as a current-routing long-tailed pair having a programmable variable tail current source.

The block 164 may be implemented, in one example, as a selector circuit. The block 166 may be implemented, in one example, as a simplified (dummy) write driver cell (or circuit). The block 166 is generally referred to herein as a write loopback cell (or circuit). The block 164 generally mediates the input of the current switch 162 from one of two sources: the write data receiver and signal conditioning stage(s) 150 or the write loopback cell 166. The write data receiver and signal conditioning stage(s) 150 may be chosen when loopback correction is performed for fly-height measurement. The write loopback cell 166 may be chosen when loopback is performed for time-delay compensation in BPM systems. The frequency response of the selector 164 and of the current switch 162 should be flat to beyond the desired test frequencies.

According to the teachings of the present invention the read loopback circuit 160 is added effectively in parallel to the input stage(s) 140 and configured so that an output of the read loopback circuit 160 may be selected under user control in lieu of the outputs of the input stage(s) 140. In similar fashion, the write loopback circuit 166 is provided effectively in parallel to the write driver(s) 152. In one example, the write loopback circuit 166 may, under user control, be directed to receive input from the terminal 138, in which case an arbitrary number of writer driver(s) 152 may still be driven by the output of the block 150. The read loopback circuit 160 and the write loopback circuit 166 are linked by the switch 164 and the variable gain block 162.

In general, including the write loopback driver 166 in the loopback excitation path is undesirable during fly-height loopback compensation calibration, as pulse asymmetries may affect the extracted loopback harmonic amplitudes. For BPM use, the additional write loopback cell 166 is included in the loopback excitation path. The write loopback cell 166 generally mimics the operation of the normal write driver cells 152, albeit at lower internal swings, while preserving the time-delay versus temperature properties of the normal write driver cells 152. In this way, a BPM loopback operation may measure delay from the write data path input terminal 138 to the read data path output terminal 136. Whenever fly-height correction loopback is active, the write driver(s) 152 may be disabled to prevent inadvertent writing on the storage media. During BPM loopback, all write driver(s) 152 may be disabled; alternatively, however one or more write drivers 152 may be active, to allow dynamic correction of write clock phasing during a write operation.

To determine differential gain correction values using the loopback technique in accordance with the present invention, a digital sequence having frequency components at $f_1$, $f_2$ is generally applied to the write data path input terminal 138. The read data path output at the terminal 136 is then analyzed (e.g., by discrete Fourier transformation (DFT) in the recording channel) to determine the relative amplitudes of the $f_1$, $f_2$ components. Alternatively, pure $f_1$ or $f_2$ tones may be driven in succession onto the terminal 138, and two measurements made, again using DFT technique, since the current switch 162 and the PECL receiver 150 are both high-gain current-mode circuits. The loopback procedure should be performed immediately after the post-touchdown baseline measurement, to obtain an initial loopback baseline response that is permanently saved in a memory of the drive. Subsequent loopback procedures may be performed whenever a fly-height measurement is made. Correction for preamplifier relative gain variation may be based on the difference between the (saved) baseline and the subsequent loopback result.

In general, a preamplifier loopback measurement in accordance with the present invention implicitly includes the effects of the flex circuit 118 and the channel analog chain 120. This is beneficial, and obviates a need for separate local loopback calibration of the channel analog chain. In general, the loopback procedure may not account for mis-termination effects arising from FOS/Zin mismatch variation. Accordingly, preamplifiers implemented in accordance with the present invention should provide broadband input impedances stable over temperature. The relative response of the tandem FOS/input stage or current-to-voltage translation network at the chosen fly-height test frequencies $f_1$, $f_2$ should not vary perceptibly over product lifetime.

Figure 7:
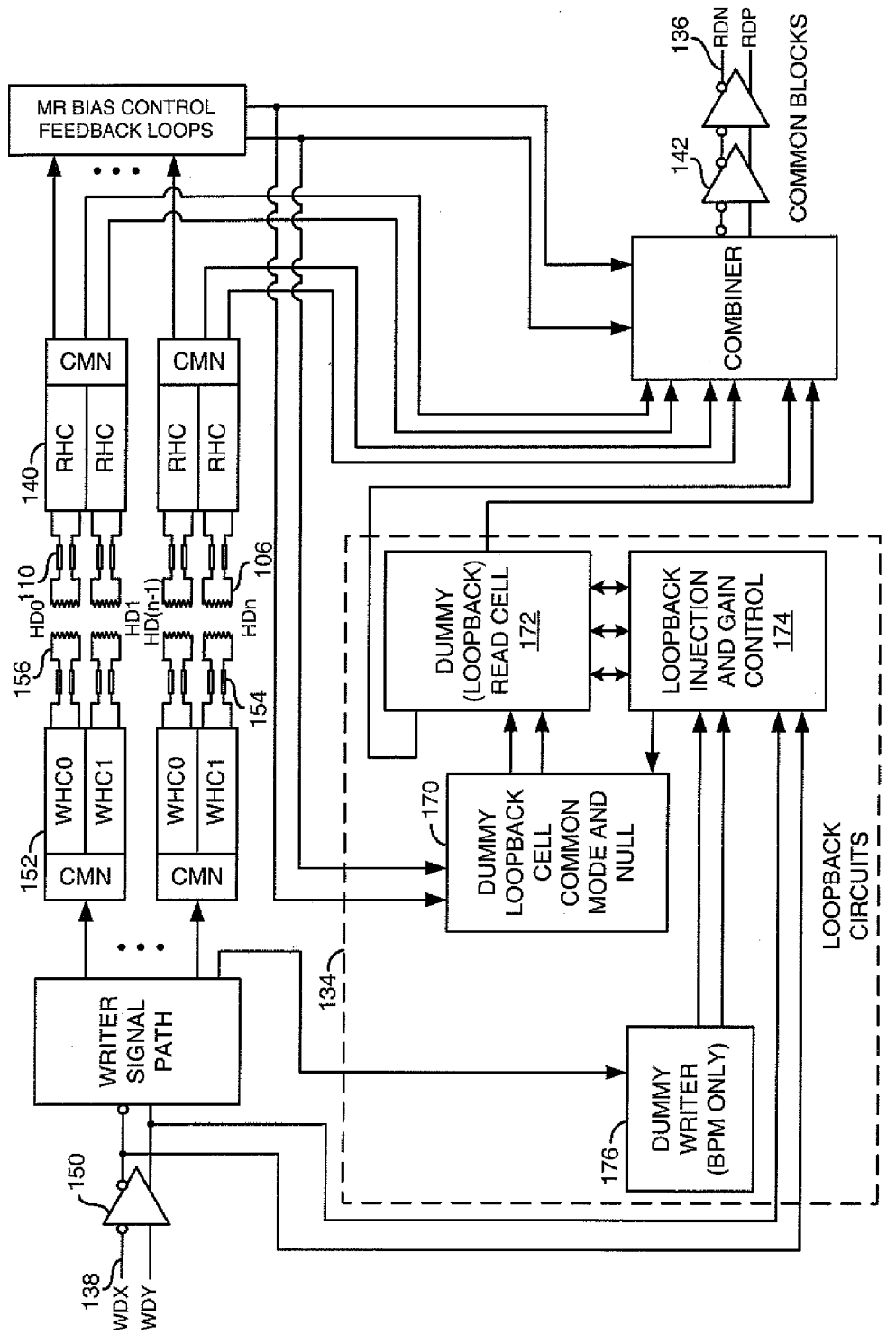
FIG. 7 is a block diagram illustrating an example implementation of the preamplifier of FIG. 6.

Referring to FIG. 7, a diagram is shown illustrating an implementation of the preamplifier 108 of FIG. 6 in additional detail. In one example, the loopback circuits of the block 134 may be arranged in a block (or circuit) 170, a block (or circuit) 172, a block (or circuit) 174, and a block (or circuit) 176. The blocks 170 and 172 are generally analogous to the read loopback cell 160 in FIG. 6. The block 174 is generally analogous to the blocks 162 and 164 in FIG. 6. The block 176 is generally analogous to the write loopback cell 166 in FIG. 6. The block 170 may be implemented, in one example, as a dummy loopback common-mode and null circuit. The block 172 may be implemented, in one example, as a dummy (loopback) read cell. The block 174 may be implemented, in one example, as a loopback injection and gain control circuit. The block 176 may be implemented, in one example, as a dummy (loopback) writer circuit.

The block 170 may contain output nulling and common-mode control circuitry associated with the dummy read cell 172. The circuitry of the block 170 may be used to assure that static offsets in the dummy read cell 172 do not overdrive the reader back-end gain stage(s) 142. Similar offset-nulling circuitry may be provided in connection with the read headcells 140. When such nulling circuits are provided, the nulling circuits associated with the read headcells 140 and the dummy read cell 172 may be merged. In one example, the loopback injection and gain control block 174 may comprise the selector block 164 and the current switch block 162 of FIG. 6 merged together. The selector block 164 and the current switch block 162 may be merged in order to reduce the increased propagation delay uncertainty were the circuits cascaded. The block 176 may comprise the write loopback cell 166 used for BPM path delay measurement.

Figure 8:
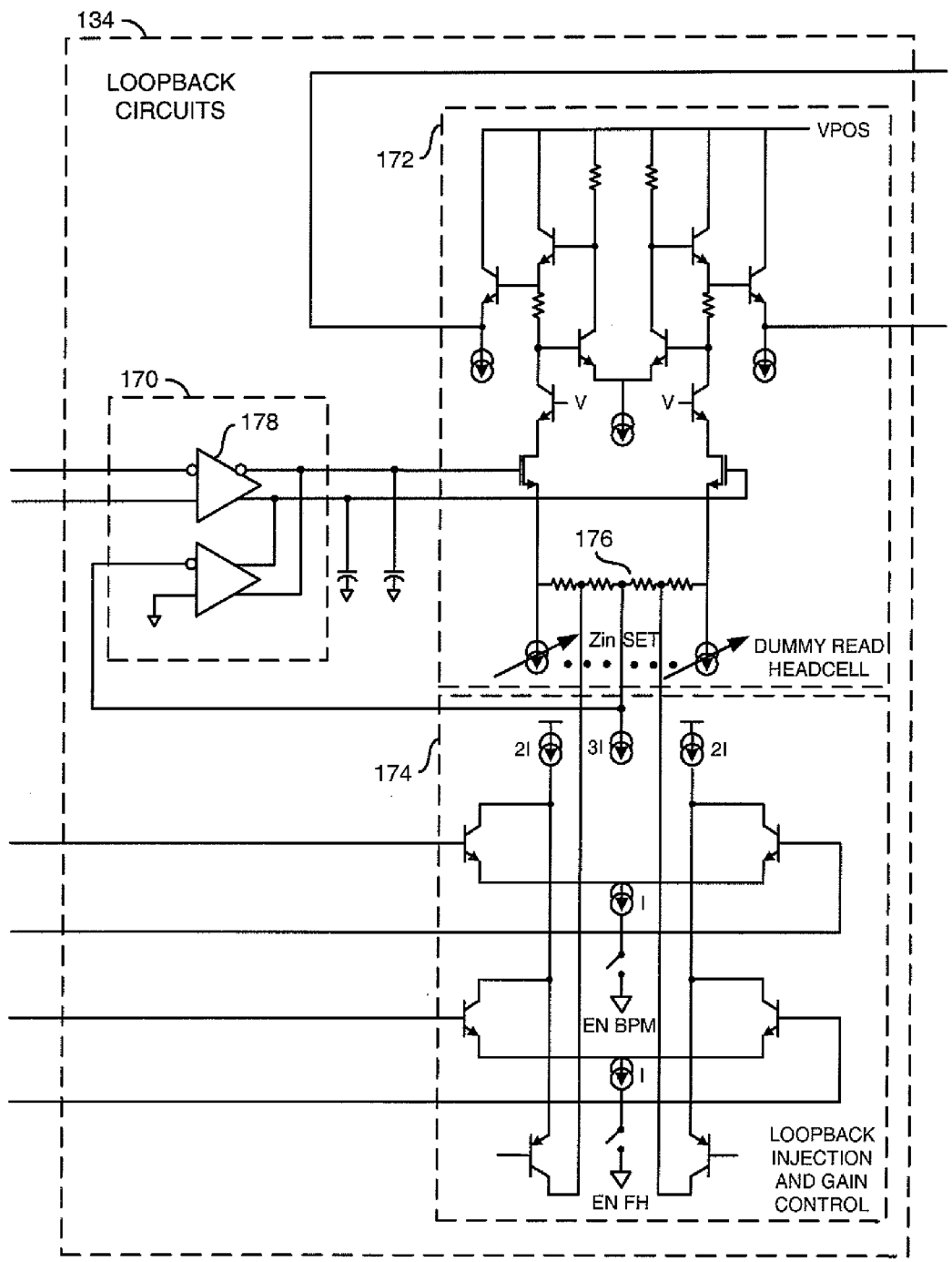
FIG. 8 is a block diagram illustrating an example implementation of a loopback circuit block of FIG. 7.

Referring to FIG. 8, a diagram is shown illustrating an example implementation of the loopback block 134 of FIG. 7. The circuit shown in FIG. 8 generally illustrates an example embodiment in accordance with the present invention. Alternate realizations are also possible, as would be apparent to those having ordinary level of skill in the art reading the teachings contained herein. In one example, the use of a complementary silicon-germanium BiCMOS process (an integration of bipolar junction transistor and complementary metal-oxide-semiconductor technologies) is preferred. However, other process technology may be used to implement the loopback block 134 without departing from the intended scope of the present invention. In one example, the loopback block 174 may be implemented using a complementary-bipolar folded-cascode. The loopback injection and gain control block 174 generally merges the functions of the selector block 164 and the variable amplitude current switch block 162 in order to reduce the increased propagation delay uncertainty were the circuits cascaded.

In one example, the combination selector and variable amplitude current switch block 174 may deliver a current mode signal to a resistor divider 176 of the loopback read cell 172. The resistor divider 176 generally simulates a MR head. A center resistor of the resistor divider 176 may be of low value, e.g., 5Ω, allowing use of sufficient device current density in the loopback injection switch 174 to optimize device response time by operating the device at a collector current yielding maximum Ft, or Fmax. The current switch 174 may include tail current mirrors (e.g., I Ampere) that may be of variable intensity to permit control of loopback injection levels. As noted earlier, such control is preferred in order to compensate for changes in gain setting in the reader portion of the preamplifier. The (pnp) folded cascade emitter sources may be slaved to intensity 2I. Operational Transconductance Amplifiers (OTAs) 178 may establish a common mode of ground in the dummy read cell 172, and null the output of the read cell before application of the output to the gain stage(s) 142. Loop compensation may be provided by capacitors coupled at outputs of the OTAs 178. The OTAs 178 may be independent of OTAs contained in the MR bias control circuitry of the reader input stage(s) 140, or may be merged therewith. As high null-point accuracy and fast recovery time is unnecessary in loopback modes, the OTAs 178 may be of simple design.

In one example, the dummy read cell 172 may be configured as a common-gate topology, with tail sources establishing input impedance (e.g., Zin), to match the common gate/cross-coupled common gate architecture of the host preamplifier. The dummy read stage 172 could equally be of a shunt feedback differential common-emitter style. However, other dummy stage designs may be implemented to match the input stages of a particular host preamplifier.

Figure 9:
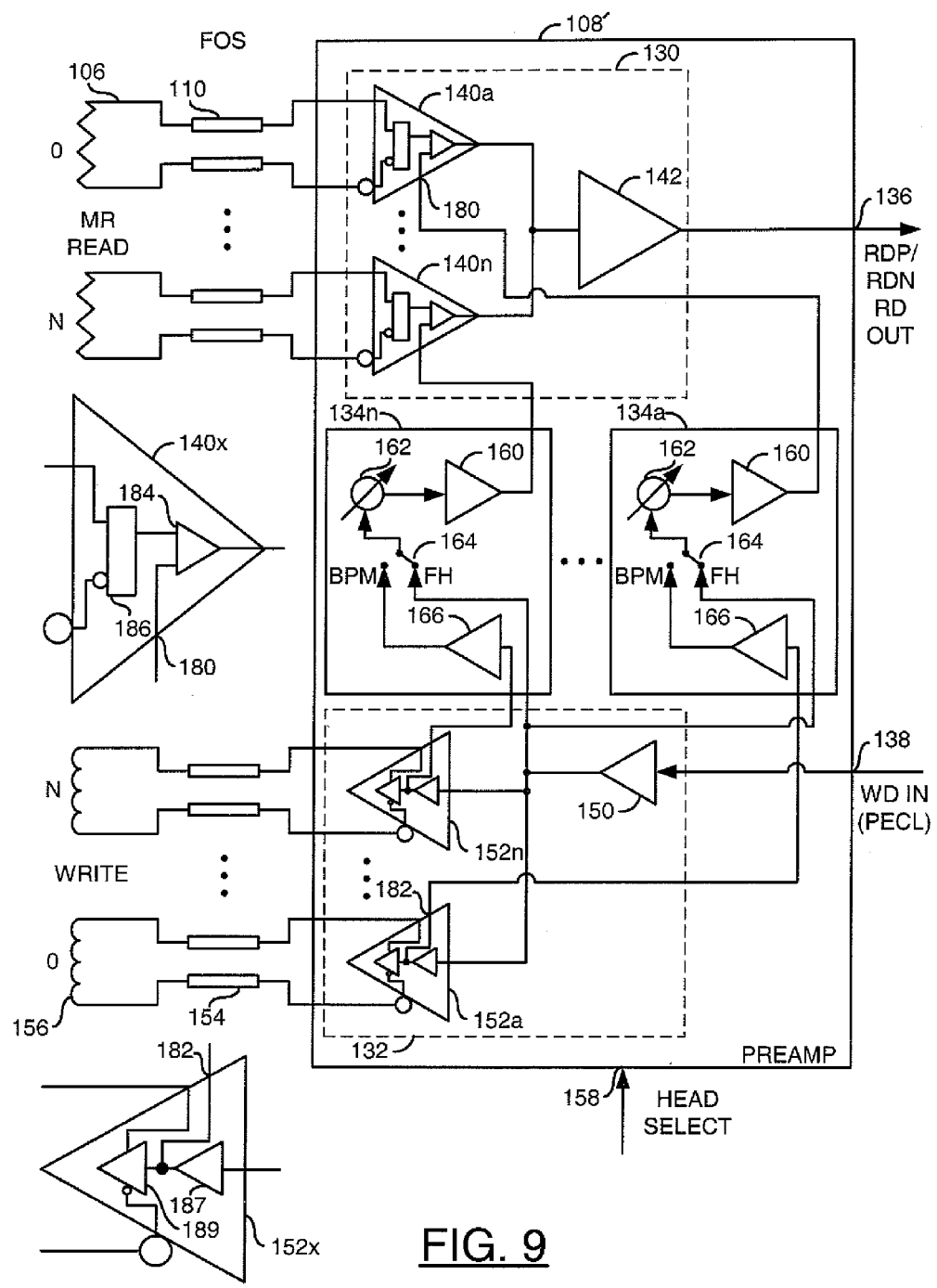
FIG. 9 is a block diagram illustrating another example implementation of the preamplifier of FIG. 2 in accordance with another example embodiment of the present invention.

Referring to FIG. 9, a diagram of a circuit 108' is shown illustrating another example preamplifier implemented in accordance with an alternative embodiment of the present invention. Like-numbered blocks are functionally equivalent to the corresponding blocks in FIG. 6. The circuit 108' omits the full dummy loopback circuit 134 of FIG. 6, in favor of a plurality of separate and smaller bridge loopback cells 134a-134n. Each of the smaller bridge loopback cells 134a-134n may be constructed similarly to the cell 134 of FIG. 6. Each bridge cell 134a-134n may serve a pair of read and write headcells (e.g., 140a and 152a, 140b and 152b, etc.). To reduce complexity, signals may be tapped from within the respective write headcells 152a-152n, as shown at 182, and driven into the respective read headcells 140a-140n, as shown at 180. Although the bridge loopback cells 134a-134n are illustrated being coupled between similarly numbered read and write heads, the particular read and write heads coupled by a given bridge loopback cell are not critical. By implementing the plurality of bridge loopback cells 134a-134n instead of the single loopback circuit 134, as illustrated in FIG. 6, the loopback path encompasses more of the read/write data path than in the implementation of FIG. 6. The result is a beneficial improved match between loopback and data transfer paths relative to the implementation illustrated in FIG. 6. Also, because of the proximity of the loopback and read/write headcells in the implementation of FIG. 9, thermally-induced parametric drift between loopback and data paths is lower in the FIG. 9 realization than in that of the FIG. 6 realization.

An exemplary read headcell 140x is shown also, illustrating that the bridge loopback cells 134a-134n may be connected to a first input of an output element 184 and other circuitry 186 of the read headcell may be connected to a second input of the element 184. An exemplary write headcell 152x is shown also illustrating that the bridge loopback cells 134a-134n may be connected between a level shifting element 187 and a write bridge element 189 of the write headcell 152.

Figure 10:
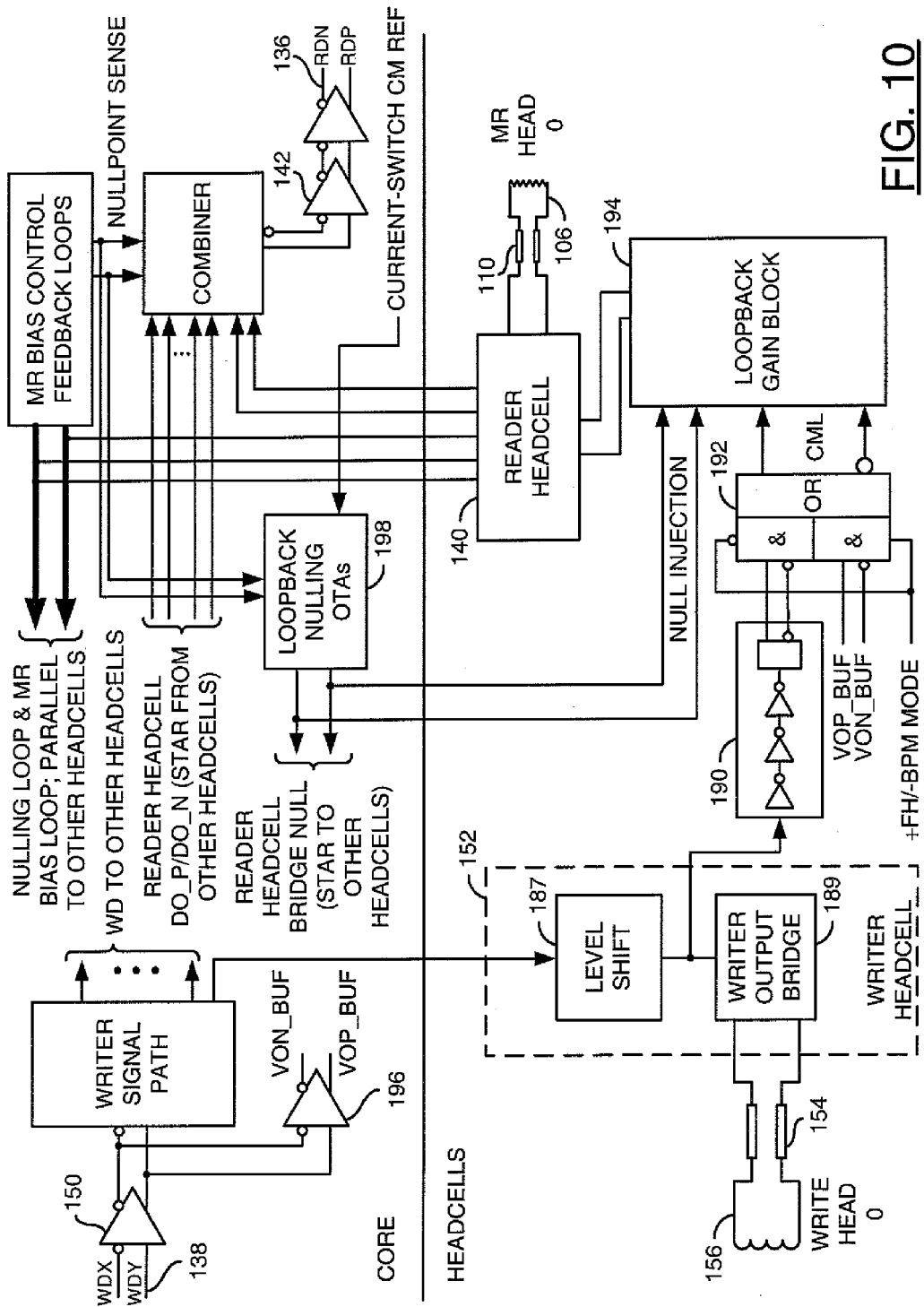
FIG. 10 is a block diagram illustrating an example implementation of loopback circuits of FIG. 9.

Referring to FIG. 10, a diagram is shown illustrating an implementation of the preamplifier 108' of FIG. 9 in additional detail. In one example, elements 106, 110, 138, 140, 142, 146, 150, 152, 154, and 156 may be implemented similarly to like-numbered elements in FIG. 7. Write headcell 152 and read headcell 140 may be, as indicated in FIG. 7, paired. A loopback channel may be introduced by bridge circuit portions 190, 192, 194, 196, and 198. The loopback bridge portions 190 and 192 may be used solely in bit patterned media recording. The portion 190 may receive input from the level shifters 187 generally present in writer cell 152. The portion 192 may receive input from the portion 190 and the PECL receiver 150. In one example, the signal from the PECL receiver 150 may be buffered by the portion 196. The portion 190 may be configured to translate a CMOS level signal into a differential signal. The portion 192 may be implemented, in one example, as an AOI gate.

The portion 190 provides a delay that approximately tracks the delay through the writer output driver 189. Selection between bit-patterned media and fly-height loopback modes may be accomplished by the AOI gate 192. The AOI gate 192 generally corresponds to the switch 164 in FIG. 9. The AOI gate receives input from PECL receivers at 150, and delivers this signal to portion 196. The portion 196 generally corresponds to the read portions 134a-134n of the bridge loopback circuit of FIG. 9. The portion 198 injects the loopback signal into read headcell 140. One loopback bridge cell comprising portions 190, 192, and 194 may be associated with each pair of the read and write headcells, 140a-140n and 152a-152n.

Nulling of offsets at input to the amplifier 142 may be accomplished by the portion 198. The portion 198 may be implemented as nulling loop OTAs and capacitors. The portion 198 injects a current into the portion 194 which servoes offsets at inputs of the amplifier 142 to zero. Instead of providing separate nulling components 198, the MR Bias Control Feedback Loops may be multiplexed to accomplish the nulling.

Yet another variant of the present bridge scheme in accordance with the present invention is to maintain the input amplifier 184 in reader headcell 140 fully biased, and suppress MR head bias. Deactivating the MR head bias generally suppresses head readback signal, allowing the loopback to predominate while reducing the complexity of the offset nulling circuits. In still another variant of the bridge scheme in accordance with the present invention, the bridge loopback cells 134a-134n may employ a simple current-switching long-tailed pair whose outputs directly inject current into the respective read headcell 140a-140n. The appeal of this method is its simplicity. However, bipolar or MOSFET devices having adequate Ft at the microampere loopback injection currents would be needed.

Figure 11:
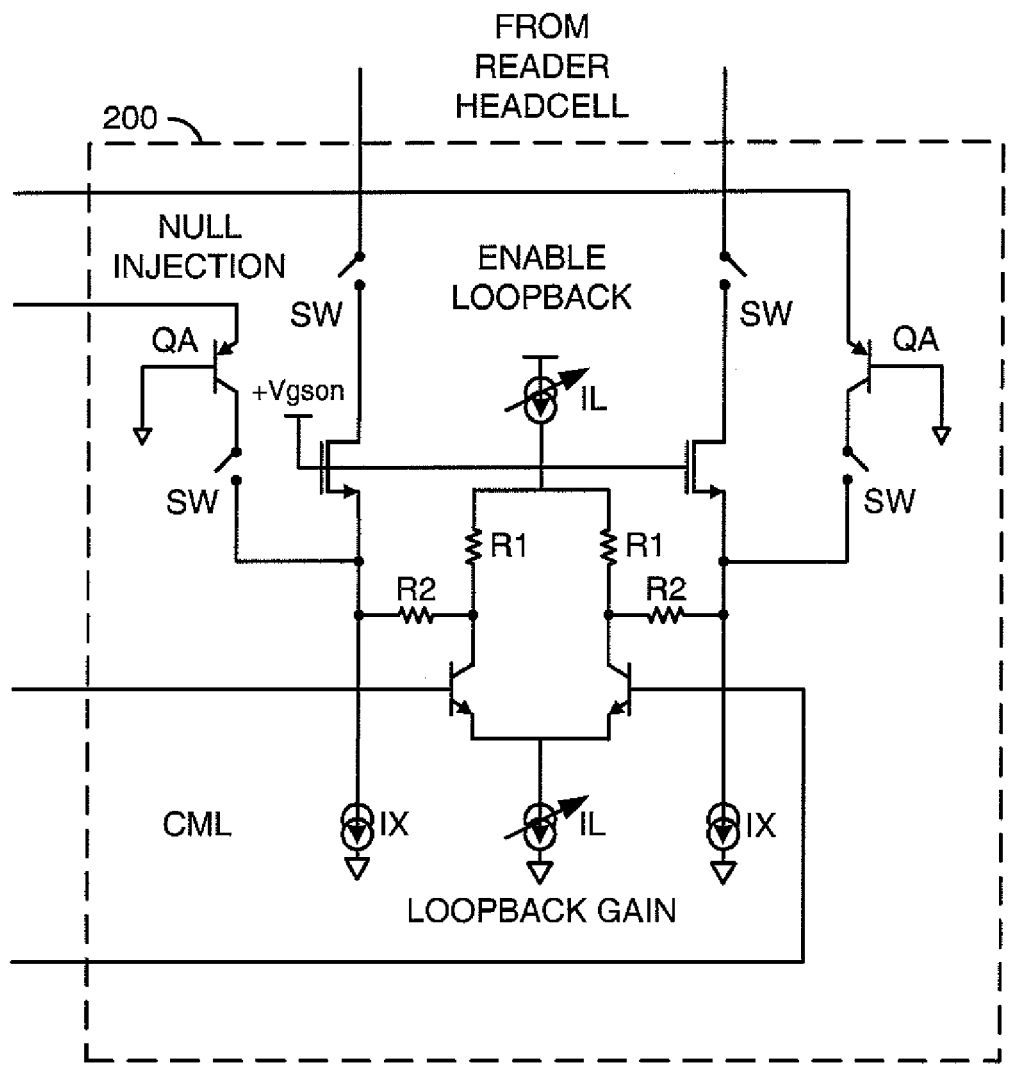
FIG. 11 is a diagram illustrating an example implementation of a loopback gain block of FIG. 10.

Referring to FIG. 11, a diagram is shown illustrating an example implementation of the loopback gain circuit 200. The circuit 200 may be used to implement the loopback gain block 194 of FIG. 10. Common base transistors QA allow injection of offset nulling current into the loopback stage. The switches are activated to select loopback injection. In one example, the switches may be control in response to a signal (e.g., ENABLE LOOPBACK). The switches may be implemented, in one example, as NMOS devices. By having multiple switches on each arm, a single loopback cell may be shared among several reader cells. The current sources IL are matched. Thus, no current from the sources IL flows in the NMOS sources. Thus, the NMOS devices are biased solely by the current sources IX. The current sources IL set the loopback gain by controlling the switched current that develops a voltage across resistors R1. The resistors R1 are generally of small value (e.g., 5-20 Ohms). Resistors R2 are generally configured to approximate the resistance of a MR head (e.g., ~200 Ohms each). The gates of the NMOS devices generally connect to a voltage source (e.g., +Vgson) that tracks Vgs(on) of the NMOS common-gate stage. In this way, the CG NMOS output is caused to be at ~0V.

Figure 12:
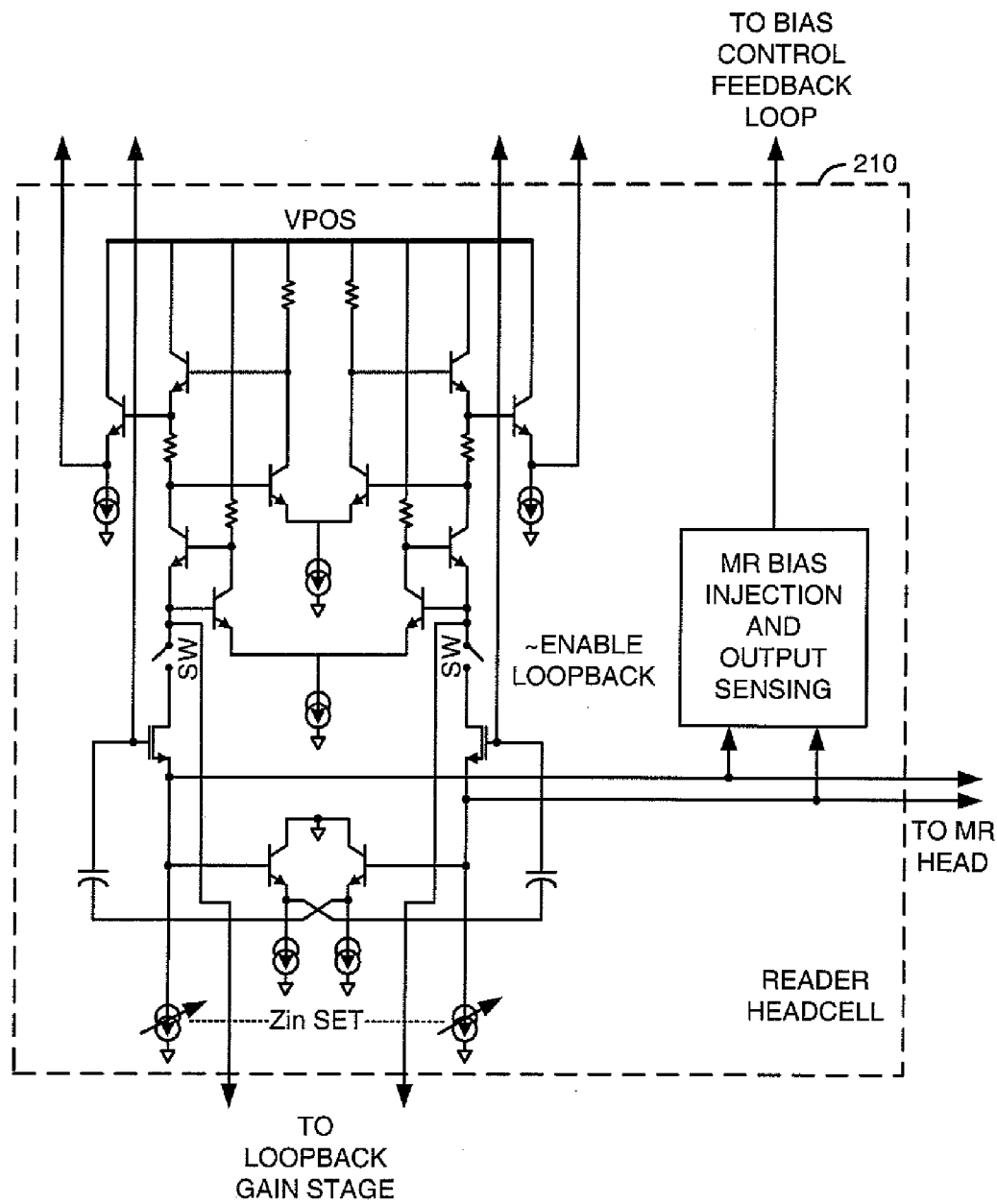
FIG. 12 is a diagram illustrating an example of a reader headcell implemented in accordance with an embodiment of the present invention.

Referring to FIG. 12, a diagram of a circuit 210 is shown illustrating an example implementation of a read headcell in accordance with the present invention. The read headcell circuit 210 may be used to implement the block 140 of FIG. 10. The circuit 210 may be implemented similarly to a conventional read headcell, except that the circuit 210 may include (i) connection points (e.g., wires) for connecting the circuit 210 to a loopback stage (e.g., the circuit 200) and (ii) switches configured to switch the circuit 210 between a normal mode (e.g., conventional reader headcell) and a loopback mode in accordance with the present invention. The switches may be implemented, in one example, as NMOS devices. The switches may act in concert with similar switches in the loopback stage. In one example, the switches may be inactivated to select a loopback mode. In one example, the switches may be controlled in response to a signal (e.g., ~ENABLE LOOPBACK). In one example, the signal ~ENABLE LOOPBACK may be a complement of the signal ENABLE LOOPBACK.

Figure 13A:
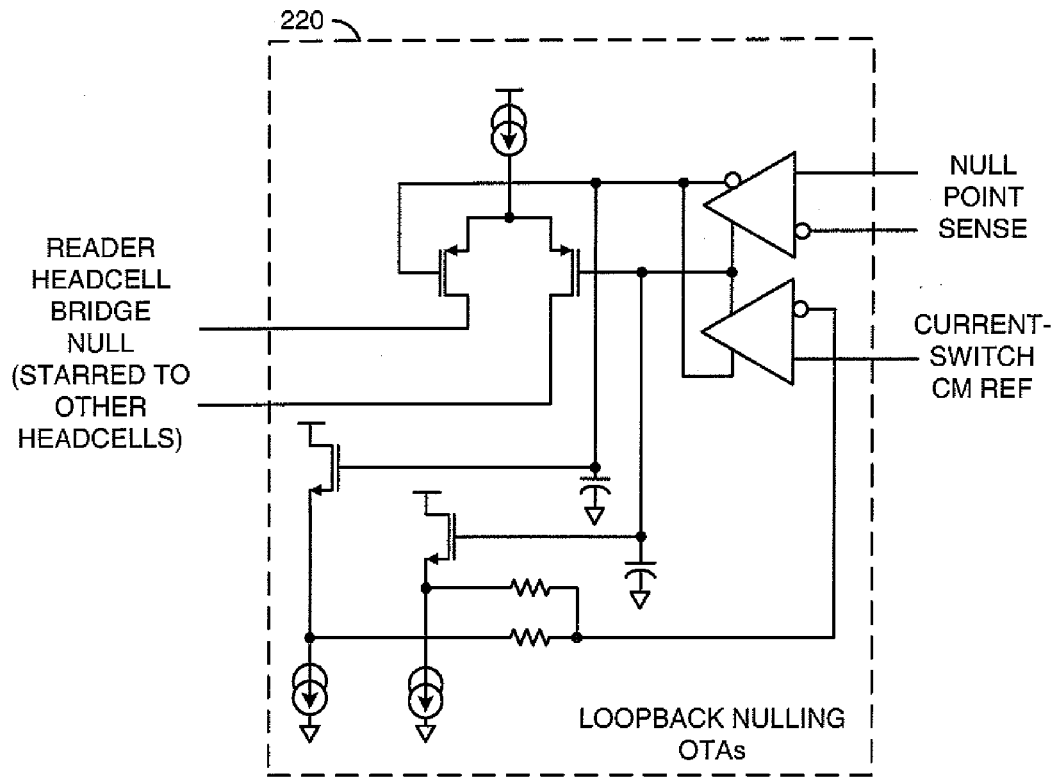
FIGS. 13A and 13B are diagrams illustrating examples of loopback nulling blocks in accordance with embodiments of the present invention.

Referring to FIG. 13A, a diagram of a circuit 220 is shown illustrating an example implementation of a loopback nulling circuit comprising operational transconductance amplifiers (OTAs). The circuit 220 may be used to implement the nulling block 198 of FIG. 10. The circuit 220 may be configured to generate a reader headcell bridge null signal that may be presented to all of the headcells. The circuit 220 may be configured to generate the reader headcell bridge null signal based upon a sense signal (e.g., NULLPOINT SENSE) and a reference signal (e.g., CURRENT_SWITCH CM REF).

Figure 13B:
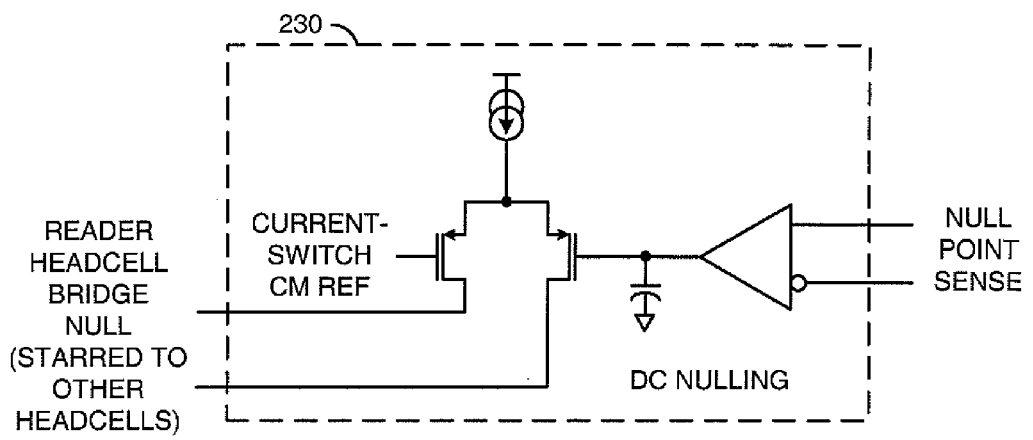

Referring to FIG. 13B, a diagram of a circuit 230 is shown illustrating another example implementation of a loopback nulling circuit. The circuit 230 is generally a simplified version of the circuit 220. For example, the circuit 230 eliminates one OTA, two NMOS devices, a capacitor, and two resistors. The OTA and the PMOS differential pair act as a dc-voltage nulling loop to remove static offsets from the inputs of the gain stages in the reader gain stage. The capacitor is selected to compensate the feedback loop.

Figure 14:
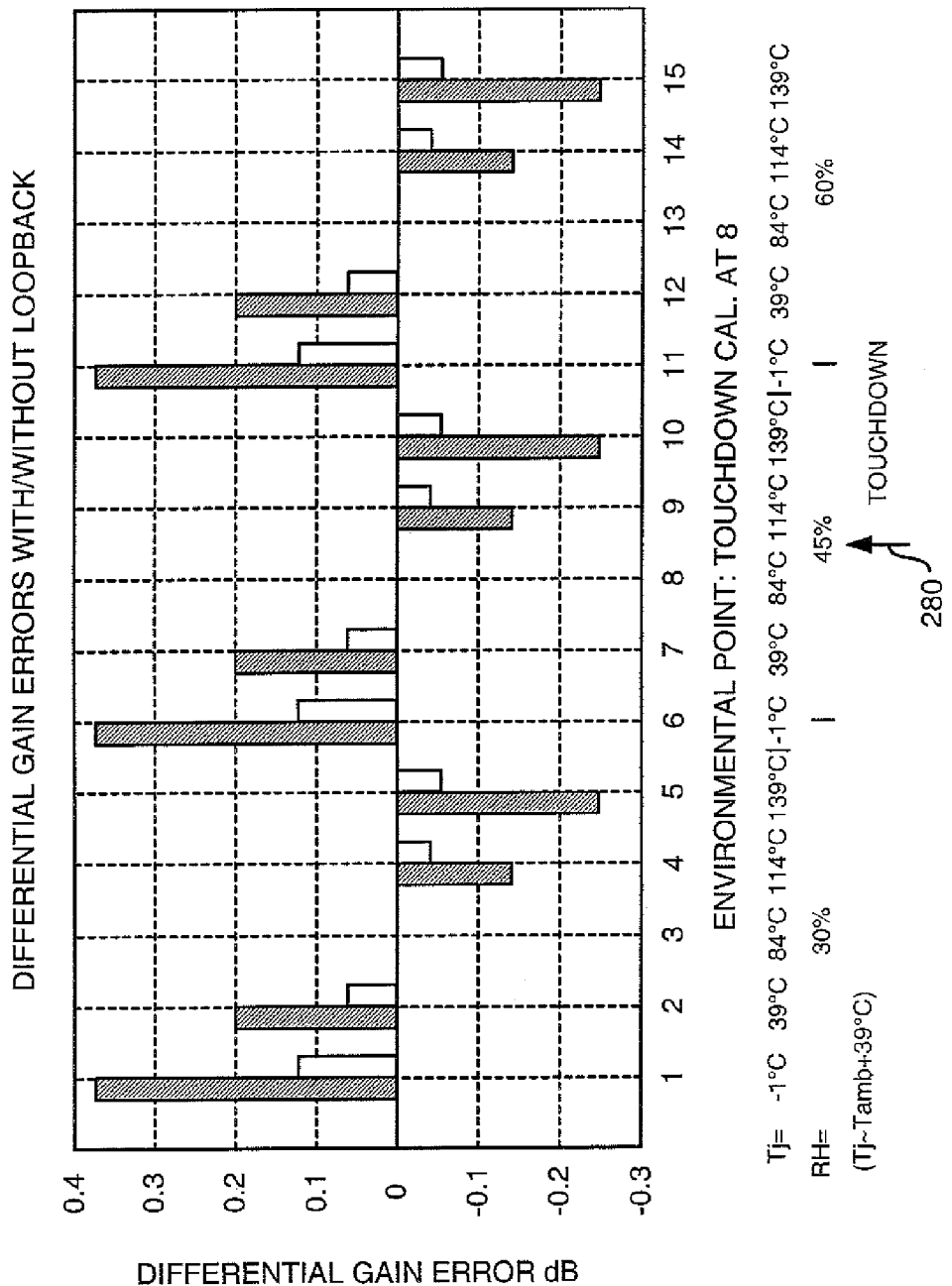
FIG. 14 is a graph illustrating a comparison between differential gain errors for an exemplary preamplifier with and without loopback compensation in accordance with the present invention.

Referring to FIG. 14, a bar chart is shown illustrating differential gain errors for a preamplifier, FOS, and MR Head, with and without loopback compensation in accordance with the present invention. The shaded bars represent uncorrected differential gain error. The white bars represent corrected differential gain error obtained with loopback compensation in accordance with the present invention. Relative humidities of 30% to 60% are covered, corresponding to internal humidity of an HDA using desiccant (humidity affects the $\in_A$ of the FOS Kapton dielectric). Preamplifier die temperatures ranging from −1° C. to 139° C., characteristic of an industrial environment, are illustrated. An arrow 280 at the abscissa midpoint identifies the environmental condition where the factory-conducted initial touchdown/backoff measurement is performed. Lighter bars indicate corrected (e.g., using loopback compensation) results for a 7200 RPM, 3.5 inch drive with head positioned near the OD (r=1.6 inch), at DR=3 Gbit/second data rate and representative $f_1$=DR/8 and $f_2$=3DR/8. A ~60% reduction in relative $f_1$, $f_2$ differential gain error has been achieved in comparison to the uncorrected values highlighted by darker bars, indicating that the preamplifier corrected in accordance with the present invention is capable of the ~±0.18 dB differential gain error permissible for fly-height measurements at ~2 nm in future 1 Tb/in$^2$ recording systems.

Figure 15:
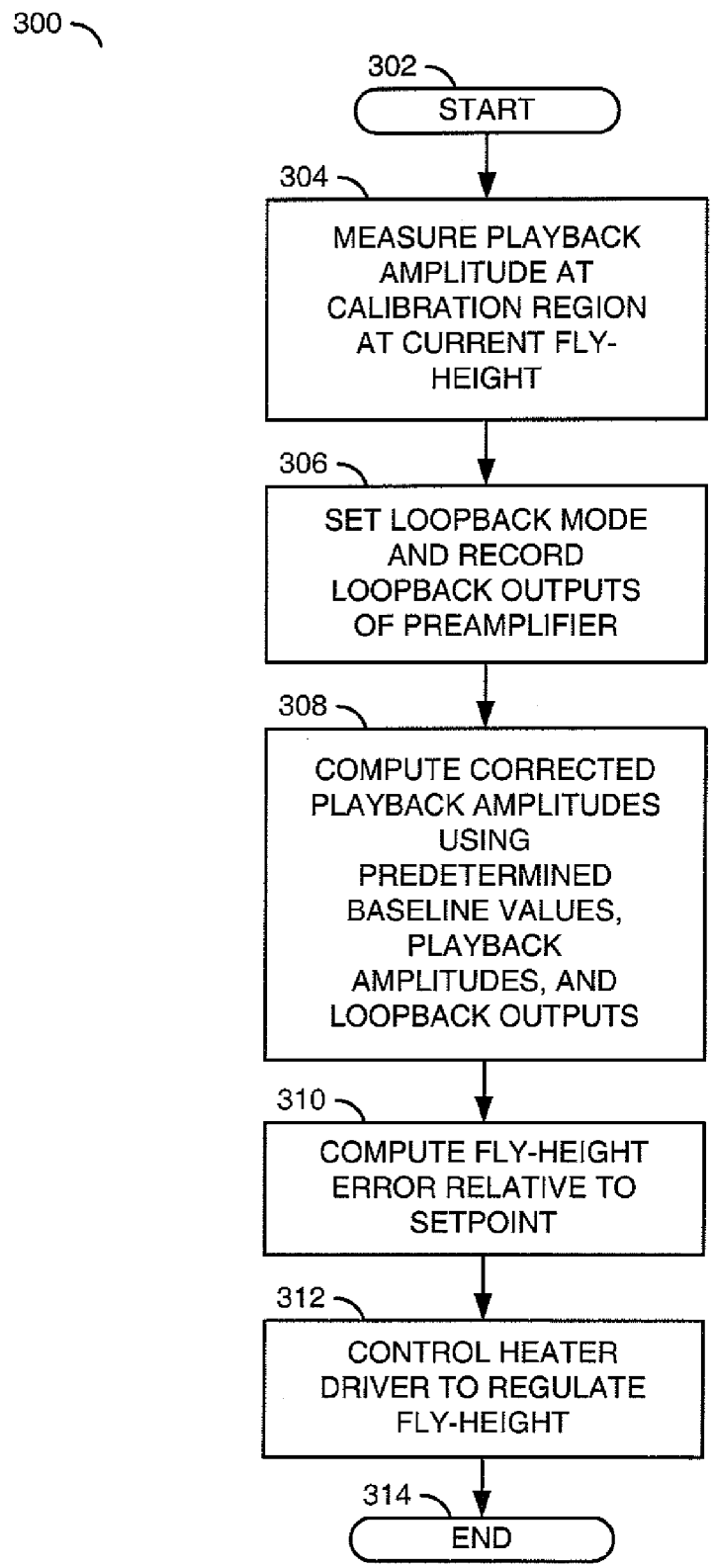
FIG. 15 is a flow diagram illustrating an example of a two-frequency fly-height measurement process including loopback compensation in accordance with the present invention.

Referring to FIG. 15, a flow diagram is shown illustrating a process 300 for a two-frequency fly-height measurement technique including loopback compensation in accordance with the present invention. The process 300 presumes that touchdown/backoff measurements have already been performed at the factory. Accordingly, the process 300 is representative of the fly-height calibration and control sequence to be performed periodically over the lifetime of the disc drive. The process (method) 300 is generally performed periodically throughout the lifetime of a drive. The method 300 generally comprises a step (or state) 302, a step (or state) 304, a step (or state) 306, a step (or state) 308, a step (or state) 310, a step (or state) 312, and a step (or state) 314. The method (or process) 300 may be implemented using the preamplifier 108. All amplitude measurements are generally expressed in decibels (dB). Although the full differential gain correction is illustrated as being applied at the step 308 for clarity, loopback correction may be split and partial compensations made immediately after each loopback trial. Memory is generally saved in the latter approach.

In the step 302, the process 300 starts. In the step 304, the head(s) are returned to a prerecorded calibration region and playback amplitudes of two (e.g., $f_1$, $f_2$) tones occurring at a current fly-height (e.g., d') are measured at the output of the preamplifier 102 (e.g., measured at the output of the read channel ADC 122). The measurements may be referred to (denoted) as $A_{f1}$ and $A_{f2}$. In the step 306, the loopback mode is set (enabled) and a composite $f_1$, $f_2$ sequence is injected on the write data lines. While the composite $f_1$, $f_2$ sequence is injected on the write data lines, amplitudes of $f_1$, $f_2$ components are recorded (e.g., at the output of the read channel ADC 122). The recorded amplitudes may be referred to as $A_{f1}^{Loopback}$ and $A_{f2}^{Loopback}$. In the step 308, corrected playback amplitudes may be computed using predetermined (e.g., factory set) baseline playback and baseline loopback values (e.g., $A_{f1}^{Corrected}=A_{f1}-(A_{f1}^{Loopback}-A_{f1}^{Loopback\ baseline})$ and $A_{f2}^{Corrected}=A_{f2}-(A_{f2}^{Loopback}-A_{f2}^{Loopback\ baseline})$. In the step 310, a fly-height error relative to setpoint $d_{BL}$; $\in=d_{BL}-d'$ may be computed using the Wallace equation. In the step 312, a compensated and scaled version of $\in$ may be applied to the heater driver 114 in the preamplifier 108, to regulate the fly-height to the setpoint $d_{BL}$. In the step 314, the process 300 may end. However, the process 300 may be repeated (e.g., multiple iterations) as necessary.

Figure 16:
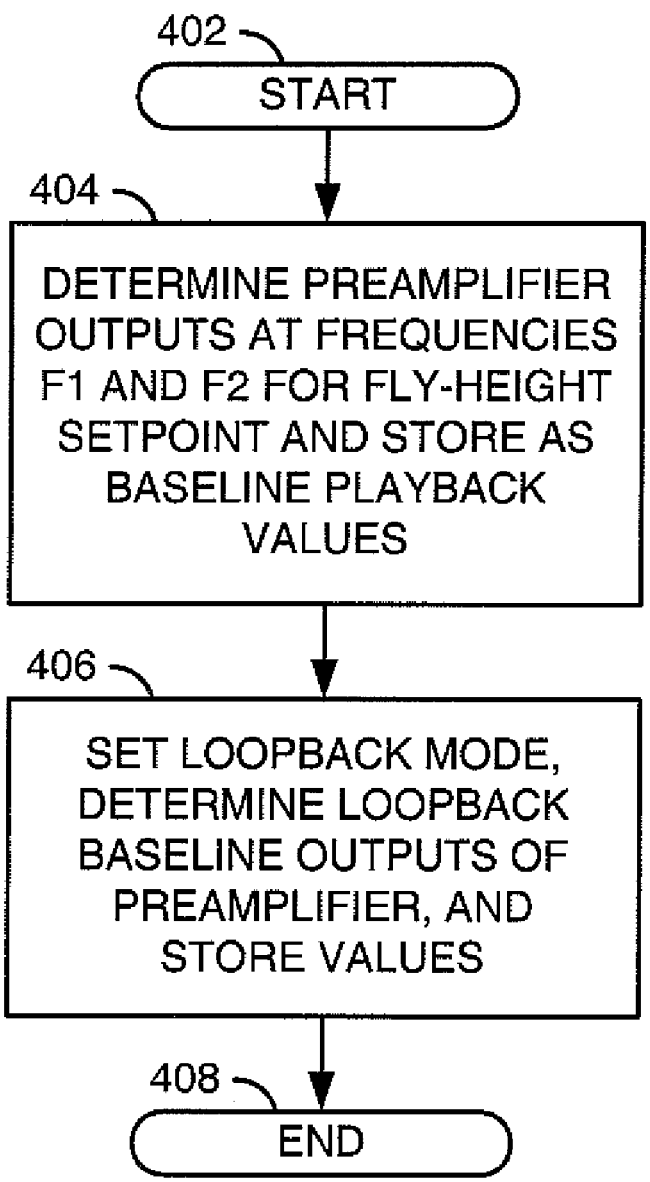
FIG. 16 is a flow diagram illustrating an example process for determining baseline values used in the process of FIG. 15.

Referring to FIG. 16, a flow diagram is shown illustrating a process 400 for measuring baseline parameters used in a two-frequency fly-height measurement technique including loopback compensation in accordance with the present invention. The process 400 generally takes place at the factory where an apparatus incorporating two-frequency fly-height measurement including loopback compensation in accordance with the present invention is manufactured or tested. The process 400 is undertaken at the factory to prevent a chance in the field of inadvertent head-disc interference. The process 400 is prerequisite to execution of the process 300 (described above in connection with FIG. 12). The method 400 generally comprises a step (or state) 402, a step (or state) 404, a step (or state) 406, and a step (or state) 408. The method (or process) 400 may be implemented using the preamplifier 108.

In the step 402, the baseline parameter measurement process 400 starts. In the step 404, at nominal environment, with the head over a prerecorded calibration region, the head is adjusted to approach 'Touchdown', then backed off to the desired Baseline/setpoint fly-height (e.g., $d_{BL}$). At the desired baseline/setpoint fly-height, amplitudes of the two (e.g., $f_1$, $f_2$) tones are detected at the output of the preamplifier 108 (e.g., measured at the output of the read channel ADC 122) and permanently saved as $A_{f1}^{baseline}$ and $A_{f2}^{baseline}$. In the step 404, a loopback mode is set immediately and a composite $f_1$, $f_2$ sequence is injected on the write data lines. While the composite $f_1$, $f_2$ sequence is injected on the write data lines, amplitudes of the $f_1$, $f_2$ tones are recorded (e.g., at the output of the read channel ADC 122) as $A_{f1}^{Loopback\ baseline}$ and $A_{f2}^{Loopback\ baseline}$, and stored. In the step 408, the process 400 ends.

The functions performed by the diagrams of FIGS. 12 and 13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
one or more read headcell circuits configured to read data from a magnetic medium via one or more read heads, wherein said read data is presented in an amplified readback signal;
one or more write headcell circuits configured to write data to the magnetic medium via one or more write heads; and
a loopback channel coupled between said one or more read headcell circuits and said one or more write headcell circuits, wherein said loopback channel comprises a loopback reader cell connected to said one or more read headcell circuits and a loopback injection and gain control circuit connected to said loopback reader cell and a write path of said apparatus.

2. The apparatus according to claim 1, wherein said loopback injection and gain control circuit comprises:
a variable-amplitude current switch connected to said loopback reader cell; and
a selector cell connected to said variable-amplitude current switch and said one or more write headcell circuits.

3. The apparatus according to claim 2, wherein said loopback channel further comprises:
a loopback write cell connected to said selector cell and said one or more write headcell circuits.

4. The apparatus according to claim 2, wherein said variable-amplitude current switch comprises a current-routing long-tailed pair.

5. The apparatus according to claim 1, wherein said loopback channel further comprises:
a pair of operational transconductance amplifiers configured to provide a common mode ground for said loopback reader cell and null an output of the loopback cell channel before presentation to the one or more read headcell circuits.

6. The apparatus according to claim 1, wherein said loopback injection and gain control circuit comprises a complementary-bipolar folded-cascade circuit.

7. The apparatus according to claim 1, wherein said loopback channel is enabled for two-frequency fly-height measurement and disabled during normal read and write operations.

8. The apparatus according to claim 7, wherein the one or more read headcell circuits and the one or more write headcell circuits are disabled during said two-frequency fly-height measurement.

9. An apparatus comprising:
one or more reader circuits configured to read data from a magnetic medium;
one or more writer circuits configured to write data to the magnetic medium; and
a loopback channel coupled between said one or more reader circuits and said one or more writer circuits, wherein said loopback channel is implemented using a complementary silicon-germanium BiCMOS process and comprises a loopback reader cell connected to said one or more read headcell circuits and a loopback injection and gain control circuit connected to said loopback reader cell and a write path of said apparatus.

10. A method comprising the steps of:
measuring two frequency amplitudes at an output of a preamplifier while reading a prerecorded calibration region of a magnetic storage medium;
enabling a loopback mode of said preamplifier and injecting a composite two-frequency sequence on write data lines of said preamplifier;
recording amplitudes of two frequencies at the output of said preamplifier while said composite two-frequency sequence is being injected on said write data lines of said preamplifier; and
computing corrected playback amplitudes using (i) the amplitudes measured while reading the prerecorded calibration region, (ii) the amplitudes recorded in the loopback mode, and (iii) predetermined baseline loopback values.

11. The method according to claim 10, wherein said predetermined baseline loopback values are stored in a memory of a disk file comprising said magnetic medium.

12. The method according to claim 10, further comprising:
computing a fly-height error relative to a predetermined setpoint fly-height using said corrected playback amplitudes and Wallace spacing loss equation.

13. The method according to claim 12, further comprising applying a compensated and scaled version of the fly-height error relative to setpoint to a heater driver element to regulate fly-height to the predetermined setpoint.

14. The method according to claim 13, further comprising: performing two or more iterations of the steps of claim 10.

15. The method according to claim 12, wherein the predetermined loopback baseline values are determined at the factory by:
moving a read head over the prerecorded calibration region of the magnetic storage medium;
controlling the head to approach touchdown and then backing the head off to the predetermined setpoint fly-height;
at the predetermined setpoint fly-height, measuring two amplitudes of two frequencies at the output of the preamplifier and permanently storing the measured amplitudes;
enabling a loopback mode of the preamplifier and injecting and injecting a composite two-frequency sequence on the write data lines of the preamplifier;
recording amplitudes of two frequencies at the output of the preamplifier while said composite two-frequency sequence is being injected on said write data lines of said preamplifier; and
storing the recorded amplitudes as said predetermined loopback baseline values.

16. The method according to claim 15, wherein said predetermined values are measured at nominal environment.

17. The method according to claim 15, wherein touchdown is sensed through an oscillation superposed on a track-following position error signal, or by auxiliary acoustic or thermal sensors.

18. An apparatus comprising:
one or more reader circuits configured to read data from a magnetic medium;
one or more writer circuits configured to write data to the magnetic medium; and
a loopback channel coupled between said one or more reader circuits and said one or more writer circuits, said loopback channel comprising a loopback reader cell connected to said one or more reader circuits and a loopback injection and gain control circuit connected to said loopback reader cell and a write path of said apparatus, wherein said loopback injection and gain control circuit comprises a complementary-bipolar folded-cascode circuit.

19. An apparatus comprising:
one or more reader circuits configured to read data from a magnetic medium;
one or more writer circuits configured to write data to the magnetic medium; and
a loopback channel coupled between said one or more reader circuits and said one or more writer circuits, wherein said loopback channel comprises a loopback reader cell connected to said one or more reader circuits and a pair of operational transconductance amplifiers configured to provide a common mode ground for said loopback reader cell and null an output of the loopback channel before presentation to the one or more reader circuits.

* * * * *